(12) United States Patent
Arita et al.

(10) Patent No.: US 9,052,998 B2
(45) Date of Patent: Jun. 9, 2015

(54) MAP DISPLAY DEVICE, NAVIGATION DEVICE AND MAP DISPLAY METHOD

(75) Inventors: Hidekazu Arita, Tokyo (JP); Mitsuo Shimotani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 13 days.

(21) Appl. No.: 13/978,216

(22) PCT Filed: Feb. 24, 2011

(86) PCT No.: PCT/JP2011/001064
§ 371 (c)(1),
(2), (4) Date: Jul. 3, 2013

(87) PCT Pub. No.: WO2012/114381
PCT Pub. Date: Aug. 30, 2012

(65) Prior Publication Data
US 2013/0282265 A1    Oct. 24, 2013

(51) Int. Cl.
*G06F 17/00* (2006.01)
*B60L 11/18* (2006.01)
(Continued)

(52) U.S. Cl.
CPC ............. *G06F 17/00* (2013.01); *Y02T 10/7005* (2013.01); *Y02T 90/161* (2013.01); *B60L 11/1861* (2013.01); *B60L 2240/62* (2013.01); *B60L 2250/16* (2013.01); *B60L 2260/52* (2013.01); *G01C 21/3469* (2013.01); *G01C 21/3667* (2013.01); *G01C 21/3697* (2013.01); *Y02T 10/7044* (2013.01); *Y02T 10/705* (2013.01);
(Continued)

(58) Field of Classification Search
CPC ............ Y02T 10/7005; Y02T 10/7044; Y02T 10/705; Y02T 90/16; Y02T 90/162; Y02T 90/161; G06F 17/00; G01C 21/3469; G01C 21/3667; G01C 21/3697; B60L 2260/54; B60L 11/1861; B60L 2240/62; B60L 2250/16; B60L 2260/52; B60L 1/003; B60L 2240/12; B60L 2240/34
USPC ......................................................... 701/123
See application file for complete search history.

(56) References Cited

U.S. PATENT DOCUMENTS 5,539,399 A    7/1996    Takahira et al.
6,691,027 B1   2/2004    Tu
(Continued)

FOREIGN PATENT DOCUMENTS

JP    7-85397 A    3/1995
JP    8-54245 A    2/1996
(Continued)

*Primary Examiner* — Mary Cheung
*Assistant Examiner* — Brian P Sweeney
(74) *Attorney, Agent, or Firm* — Birch, Stewart, Kolasch & Birch, LLP

(57) ABSTRACT

A map display device includes a position information acquiring unit for acquiring the present position of a vehicle; a map data storage unit for storing map data; a remaining energy acquiring unit for acquiring a residual quantity of energy for driving the vehicle and equipment mounted on the vehicle; a range calculating unit for computing a range the vehicle can travel with the remaining energy, using a moving energy consumption rate which is energy consumption per unit time required for moving the vehicle and a driving energy consumption rate Eci which is energy consumption per unit time required for driving the equipment mounted on the vehicle; and an output control unit for displaying the range on a map using the map data.

13 Claims, 26 Drawing Sheets

(51) Int. Cl.
  *G01C 21/34* (2006.01)
  *G01C 21/36* (2006.01)
  *B60L 1/00* (2006.01)

(52) U.S. Cl.
  CPC ............... *Y02T 90/16* (2013.01); *Y02T 90/162* (2013.01); B60L 1/003 (2013.01); *B60L 2240/12* (2013.01); *B60L 2240/34* (2013.01); *B60L 2250/10* (2013.01); *B60L 2250/12* (2013.01); *B60L 2260/54* (2013.01)

(56) References Cited

U.S. PATENT DOCUMENTS

2003/0006914 A1  1/2003  Todoriki et al.
2010/0138098 A1  6/2010  Takahara et al.
2011/0077854 A1* 3/2011  Fushiki et al. ................ 701/201

FOREIGN PATENT DOCUMENTS

| JP | 9-119839 A | 5/1997 | |
|---|---|---|---|
| JP | 2003-21522 A | 1/2003 | |
| JP | 2004-20565 A | 1/2004 | |
| JP | 2007-178216 A | 7/2007 | |
| JP | 2008-87719 A | 4/2008 | |
| JP | 2009-25128 A | 2/2009 | |
| JP | 2010-169423 A | 8/2010 | |
| JP | 2010-210271 A | 9/2010 | |
| JP | 2010-286400 | * 12/2010 | ............. G01C 21/00 |
| JP | 2010-286400 A | 12/2010 | |

* cited by examiner

FIG.8
(a)
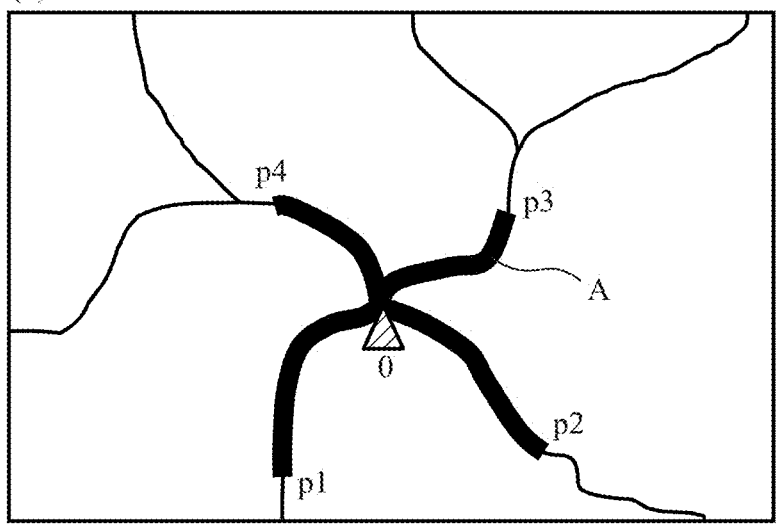
(b)
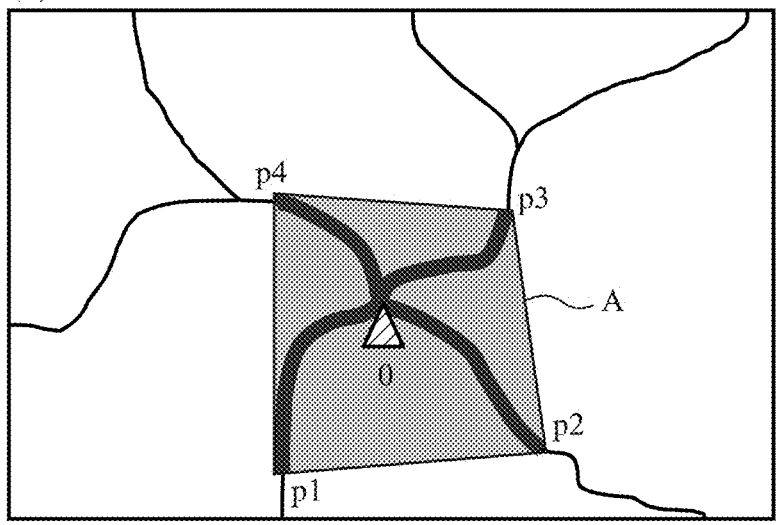

FIG.14

(a) Sunset Timetable

| | Location | | | |
|---|---|---|---|---|
| | ○○Prefecture△△Area | ○○Prefectur□□Area | △△Prefectur☆☆Area | ・・・ |
| Jan 1, 2010 | 17:20 | | | |
| Jan 2, 2010 | | | | |
| Jan 3, 2010 | | | | |
| ・・・・ | | | | |
| | | | | |
| | | | | |
| | | | | |
| Dec 31, 2010 | | | | |

(b) Sunrise Timetable

| | Location | | | |
|---|---|---|---|---|
| | ○○Prefecture△△Area | ○○Prefectur□□Area | △△Prefectur☆☆Area | ・・・ |
| Jan 1, 2010 | 6:43 | | | |
| Jan 2, 2010 | | | | |
| Jan 3, 2010 | | | | |
| ・・・・ | | | | |
| | | | | |
| | | | | |
| | | | | |
| Dec 31, 2010 | | | | |

FIG.22
(a)
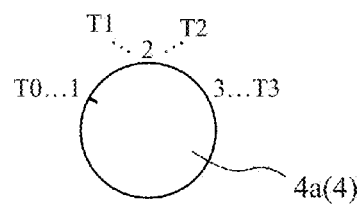
(b)
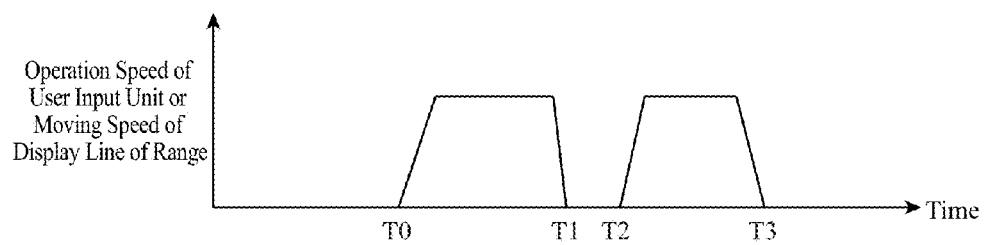
(c)
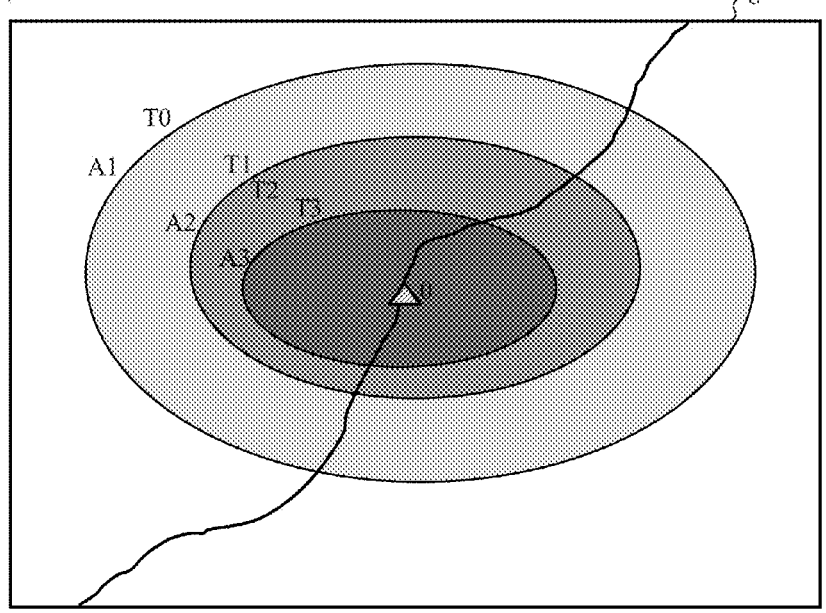

FIG.23
(a)
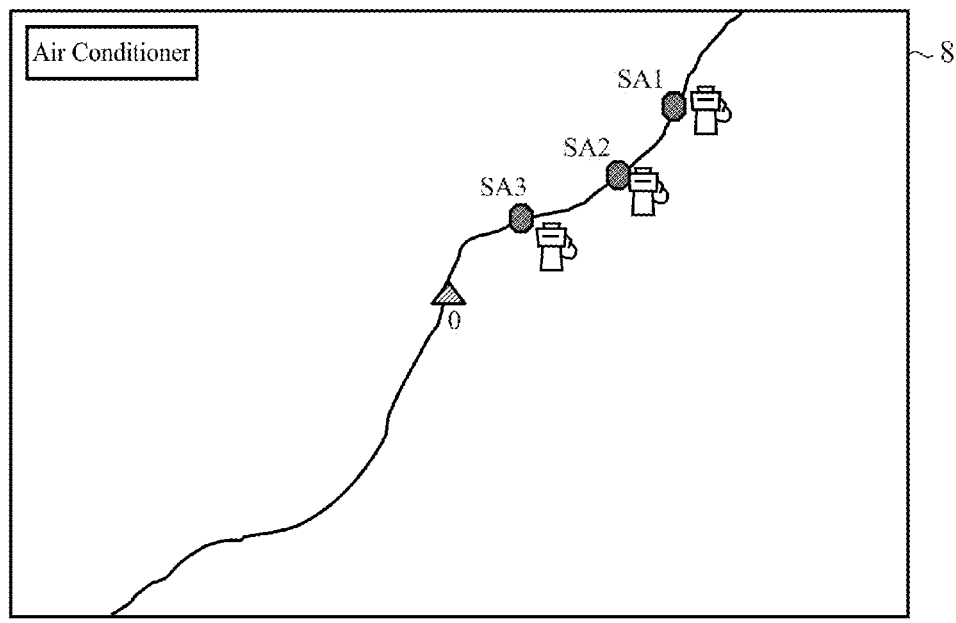
(b)
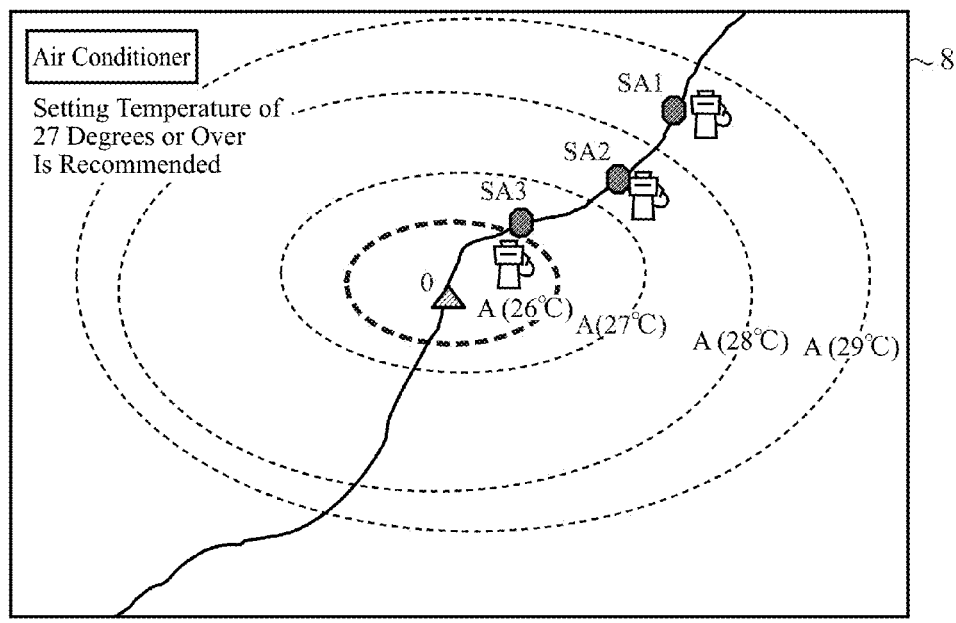

MAP DISPLAY DEVICE, NAVIGATION DEVICE AND MAP DISPLAY METHOD

TECHNICAL FIELD

The present invention relates to a map display device for carrying out map display considering energy consumption of a mobile unit, a navigation device comprising the map display device and a map display method.

BACKGROUND ART

Conventionally, a map display device has been used which is mounted on a mobile unit such as a car, detects the present position of the vehicle using GPS or the like and displays the position on a display together with a road map. Furthermore, with the recent spread of electric vehicles and hybrid vehicles, a technique is utilized which displays a range the mobile unit can cover with the present remaining energy, or an energy supply necessary for the mobile unit to continue traveling together with the map display. For example, a map display device disclosed in Patent Document 1 calculates, when charging the battery of a driving motor, a range the mobile unit can cover after charging the battery for a plurality of periods of time considering the remaining battery life, and displays the result on a display. In addition, a vehicle control device disclosed in Patent Document 2 shows a fuel station reachable under an energy-saving driving mode to a driver, even though only one reachable fuel station remains in a normal driving mode, and controls the driving mode of the vehicle so that it can reach the fuel station the driver desires.

PRIOR ART DOCUMENT

Patent Document

Patent Document 1: Japanese Patent Laid-Open No. 2009-25128.
Patent Document 2: Japanese Patent Laid-Open No. 2007-178216.

DISCLOSURE OF THE INVENTION

Problems to be Solved by the Invention

The foregoing Patent Documents 1 and 2, however, consider only remaining battery life or fuel remaining, and do not consider energy consumption of equipment (such as an air conditioner, wipers and headlights) the mobile unit can use while it is traveling. Accordingly, it has a problem of being unable to inform a user dynamically of the range that varies depending on the energy consumption of the equipment used.

The present invention is implemented to solve the foregoing problem. Therefore it is an object of the present invention to provide a map display device capable of informing a user of the range that dynamically changes in response to the energy consumption of the equipment used while the mobile unit is traveling.

Means for Solving the Problem

A map display device in accordance with the present invention comprises: a position information acquiring unit for acquiring the present position of a mobile unit; a map data storage unit for storing map data; a remaining energy acquiring unit for acquiring a residual quantity of energy for driving the mobile unit and equipment mounted on the mobile unit; a range calculating unit for computing a reachable range of the mobile unit with the remaining energy the remaining energy acquiring unit acquires, using a moving energy consumption rate which is energy consumption per unit time required for moving the mobile unit and a driving energy consumption rate which is energy consumption per unit time required for driving the equipment mounted on the mobile unit; and an output control unit for displaying on a map the reachable range of the mobile unit the range calculating unit computes, using the map data of the map data storage unit.

Advantages of the Invention

According to the present invention, it can carry out map display capable of varying the range dynamically in accordance with the energy consumption of the equipment used while the mobile unit is traveling.

BRIEF DESCRIPTION OF THE DRAWINGS

FIG. 8 is a diagram showing a display example of a range by the map display device of the embodiment 2;
FIG. 14 is a diagram showing an example of a sunshine database of the map display device of the embodiment 3.

FIG. 22 is a diagram showing display control of a map display device of an embodiment 6;

FIG. 23 is a diagram showing a display example on the map display device of the embodiment 6;

BEST MODE FOR CARRYING OUT THE INVENTION

The best mode for carrying out the invention will now be described with reference to the accompanying drawings to explain the present invention in more detail.

Embodiment 1

Figure 1:
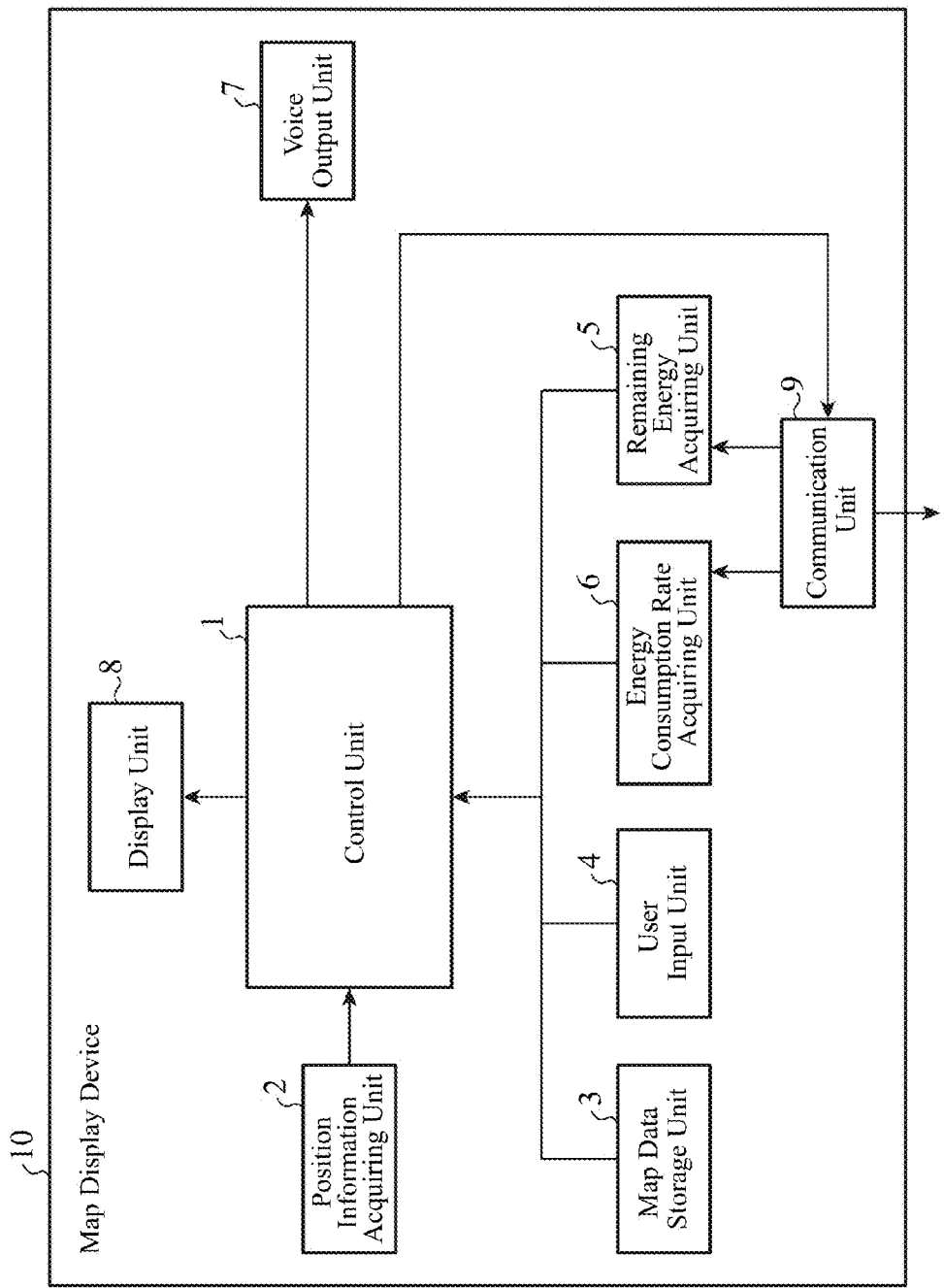
FIG. 1 is a block diagram showing a configuration of a map display device of an embodiment 1.

FIG. 1 is a block diagram showing a configuration of a map display device of an embodiment 1. In FIG. 1, the map display device 10 of the embodiment 1 comprises a control unit 1, a position information acquiring unit 2, a map data storage unit 3, a user input unit 4, a remaining energy acquiring unit 5, an energy consumption rate acquiring unit 6, a voice output unit 7, a display unit 8 and a communication unit 9. Although the map display device 10 is applicable to various mobile units, the following description will be made by way of example applied to a vehicle.

The control unit 1 is generally composed of a CPU, a memory and the like as an embedded system. The position information acquiring unit 2 obtains the position information of its own vehicle from GPS information supplied from an external device (not shown) or from various driving information such as vehicle speed information and steering angle of the wheel. The map data storage unit 3 stores map data for a navigation device. The user input unit 4, which is composed of a rotary switch, buttons, and/or a microphone, for example, accepts operation input or voice input from a user. The user input unit 4 can be implemented by software keys as well as hardware keys. The operation input or voice input is input that designates temperature setting of an air conditioner or volume setting of audio equipment, for example.

Incidentally, the following description will be made by referring to equipment such as an air conditioner or audio equipment in the vehicle as power consuming equipment, the power consumption of which increases or decreases due to user operation. As the other power consuming equipment, there are heaters, wipers, wireless equipment, a cigar lighter, external equipment connection equipment, backseat entertainment equipment (DVD or Blue-ray video playback equipment) and its screen, the interior light, cruise control setting and the like.

The remaining energy acquiring unit 5 calculates a residual quantity of energy which is required for driving the vehicle and is used by the power consuming equipment. The energy consumption rate acquiring unit 6 obtains energy consumption per unit time required for driving the vehicle and power consuming equipment (called "moving energy consumption rate" from now on). The voice output unit 7 gives a user various information the control unit 1 generates in a voice. In addition, according to need, it outputs an alarm in response to a control instruction from the control unit 1. The display unit 8 displays, in addition to map information, various information created by the control unit 1. The communication unit 9 carries out communication with an external device via an in-vehicle network (not shown) or an external network (not shown).

Figure 2:
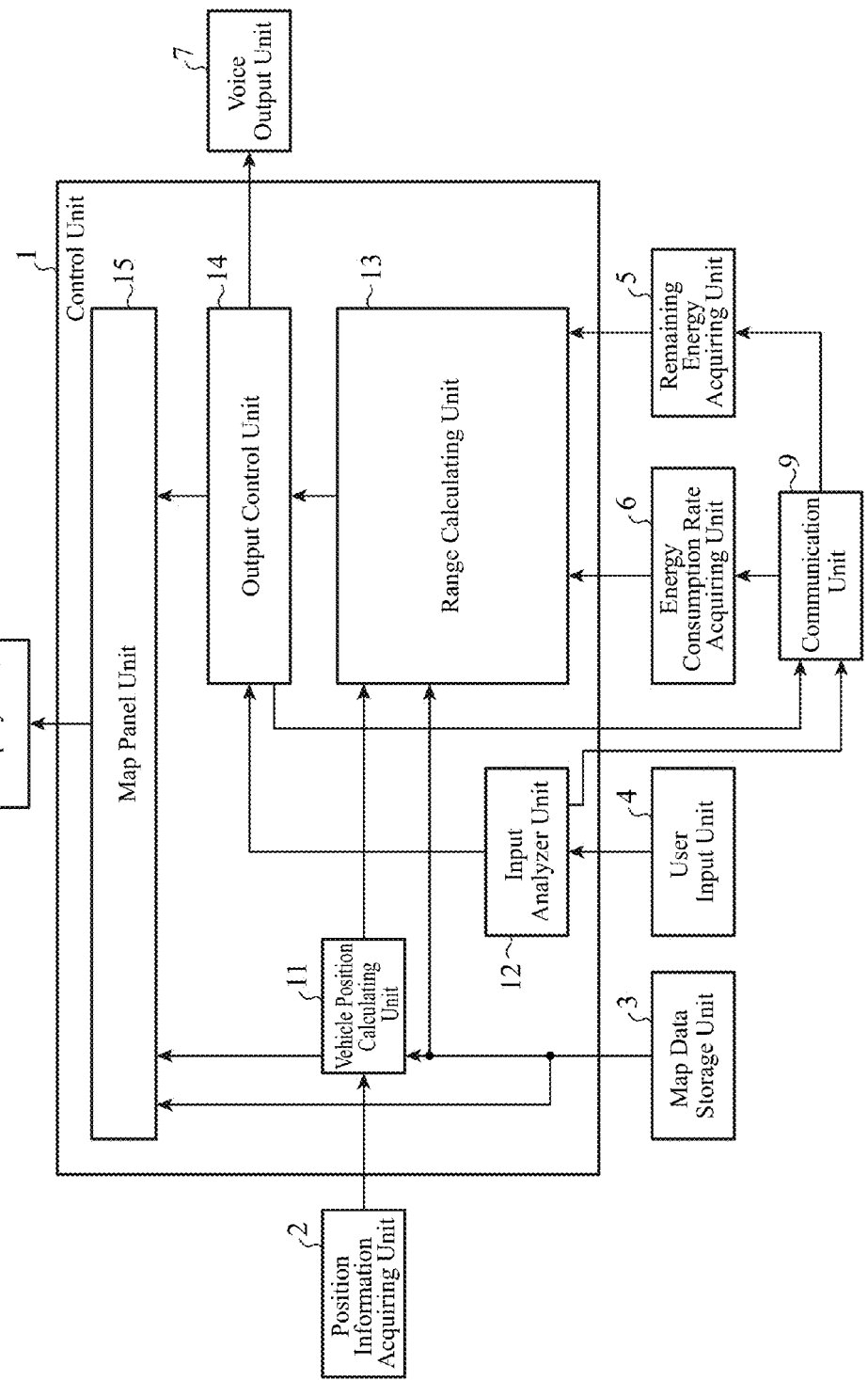
FIG. 2 is a block diagram showing a configuration of a control unit of the map display device of the embodiment 1.

Next, details of the control unit 1 will be described. FIG. 2 is a block diagram showing a detailed configuration of the control unit 1 in FIG. 1. The control unit 1 comprises a vehicle position calculating unit 11, an input analyzer unit 12, a range calculating unit 13, an output control unit 14 and a map panel unit 15.

The vehicle position calculating unit 11 performs map matching between the vehicle position information input from the position information acquiring unit 2 and the map data obtained from the map data storage unit 3, and calculates the vehicle position on the map. The input analyzer unit 12 analyzes the input data input via the user input unit 4. The range calculating unit 13 computes a cruising radius from the vehicle position information supplied from the vehicle position calculating unit 11, the map data obtained from the map data storage unit 3, the remaining energy of the vehicle obtained from the remaining energy acquiring unit 5 and the moving energy consumption rate obtained from the energy consumption rate acquiring unit 6.

The output control unit 14 carries out display control of the cruising radius computed by the range calculating unit 13. As for the display control, it controls not only the screen display of the display unit 8, but also the output of the voice signal from the voice output unit 7. For example, it controls the display unit 8 and voice output unit 7 when a warning is displayed on the display unit 8 and is output in a voice simultaneously with the warning. The map panel unit 15 stores the map data and data for displaying the vehicle position and range on the display unit 8.

Figure 3:
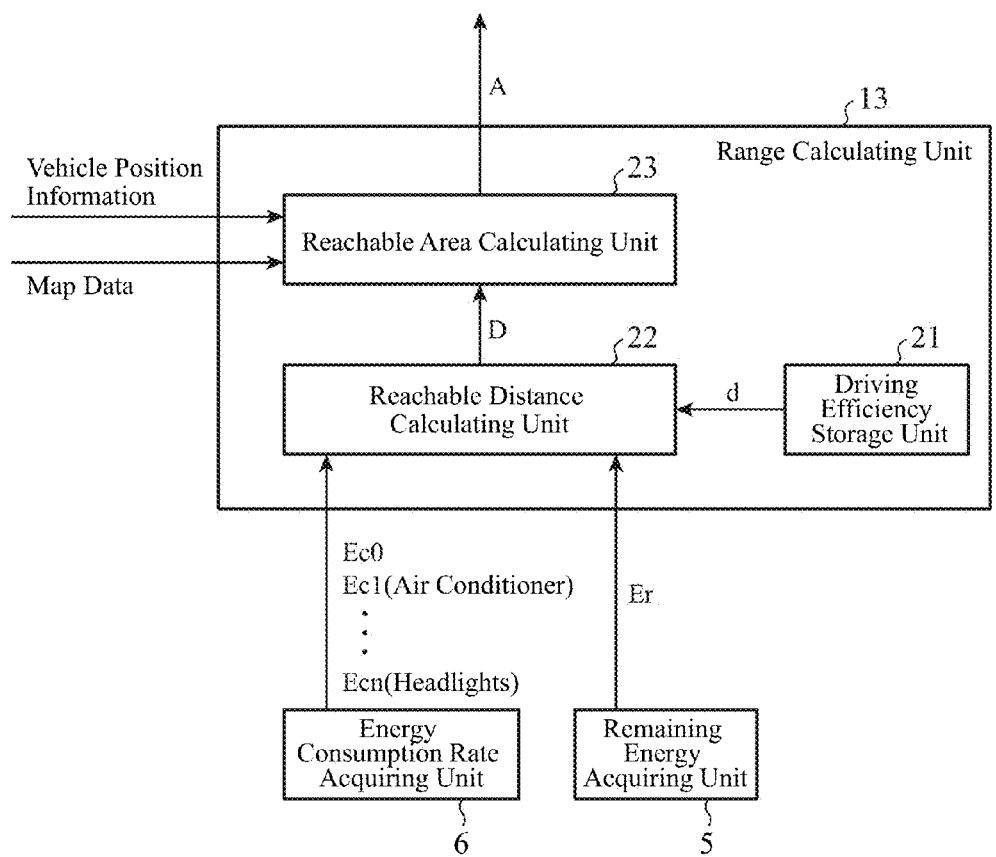
FIG. 3 is a block diagram showing a configuration of a range calculating unit of the map display device of the embodiment 1.

Next, details of the range calculating unit 13 will be described. FIG. 3 is a block diagram showing a configuration of the range calculating unit in FIG. 2.

The range calculating unit 13 comprises a driving efficiency storage unit 21, a reachable distance calculating unit 22, and a reachable area calculating unit 23.

The driving efficiency storage unit 21 stores driving efficiency during driving on a road for each road type such as an expressway, national road and ordinary road. Furthermore, it retains in advance a table establishing the correspondence between the driving speeds of the vehicle and the moving energy consumption rates, and retains constants of the reachable distances at the moving energy consumption rates in the table of the vehicle driving speeds and the moving energy consumption rates. As for the table of the vehicle driving speeds and the moving energy consumption rates, a configuration is also possible which updates it automatically in accordance with the driving record of the vehicle.

The reachable distance calculating unit 22 computes the reachable distance of the vehicle from the remaining energy obtained by the remaining energy acquiring unit 5 and from the energy consumption per unit time of the vehicle obtained by the energy consumption rate acquiring unit 6. The reachable area calculating unit 23 computes a reachable area of the vehicle from the reachable distance the reachable distance calculating unit 22 computes.

Figure 4:
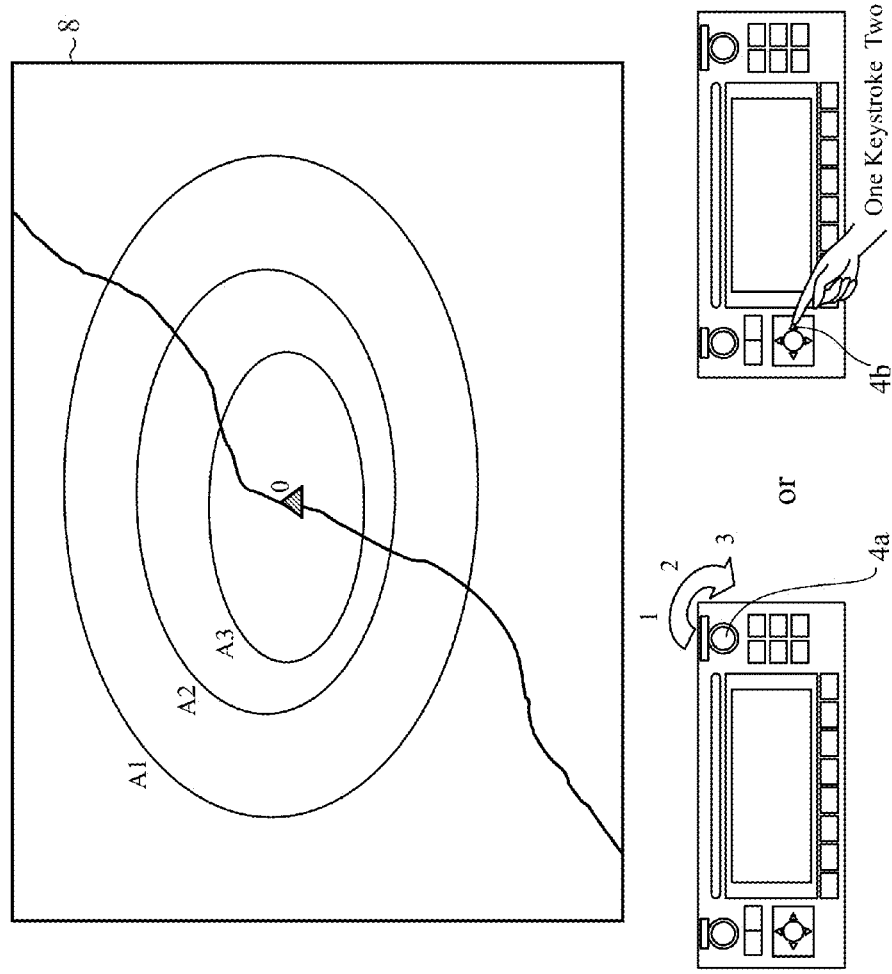
FIG. 4 is a diagram showing an operation example and its display screen of the map display device of the embodiment 1.

Next, a display example on the display unit 8 of the map display device 10 will be shown. FIG. 4 is a diagram showing a display example of the map display device of the embodiment 1, which shows an example that alters its display contents in accordance with the volume control of the audio equipment which is the power consuming equipment.

When a user rotates the rotary switch 4a or presses the button 4b of the audio equipment, which is the user input unit 4, an ellipse A which is displayed on the map on the display unit 8 to indicate the range is shown with its center placed on the vehicle position O and with its scale being reduced or increased in response to the operation. More specifically, when rotating the rotary switch 4a to the position "1" or pushing the button 4b once, the range A1 is displayed on the display unit 8 in response to the operation. Likewise, when rotating the rotary switch 4a to the position "2" or pushing the button 4b twice, the range A2 is displayed, and when rotating the rotary switch 4a to the position "3" or pushing the button 4b three times, the range A3 is displayed. In this way, when the audio equipment is operated in the direction of increasing the volume, the power consumption increases and the range A is reduced.

Figure 5:
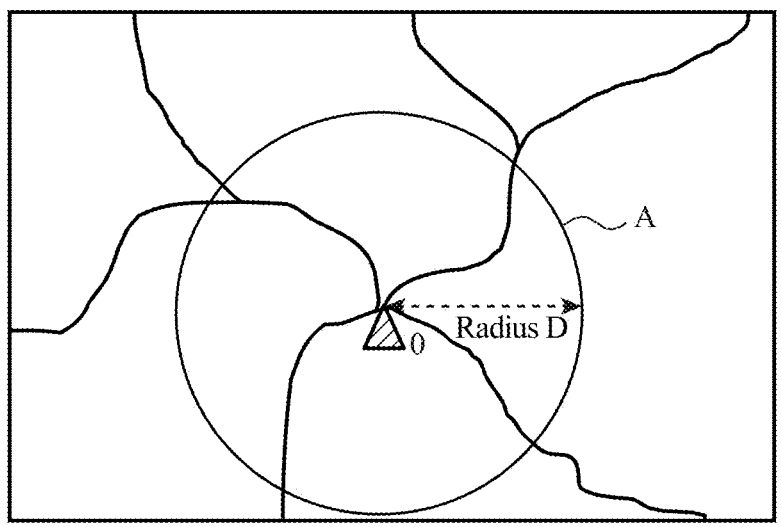
FIG. 5 is a diagram showing a display example of a range on the map display device of the embodiment 1.

Although FIG. 4 shows an example that displays the ranges A1-A3 using ellipses with their center placed on the vehicle position O, the display of the range A is not limited to an ellipse. For example, as shown in FIG. 5, it can be displayed using a circle which has its center placed on the vehicle position O and has a radius of the reachable distance (range D, details of its computing method will be described later) of the vehicle the reachable distance calculating unit 22 computes.

Figure 6:
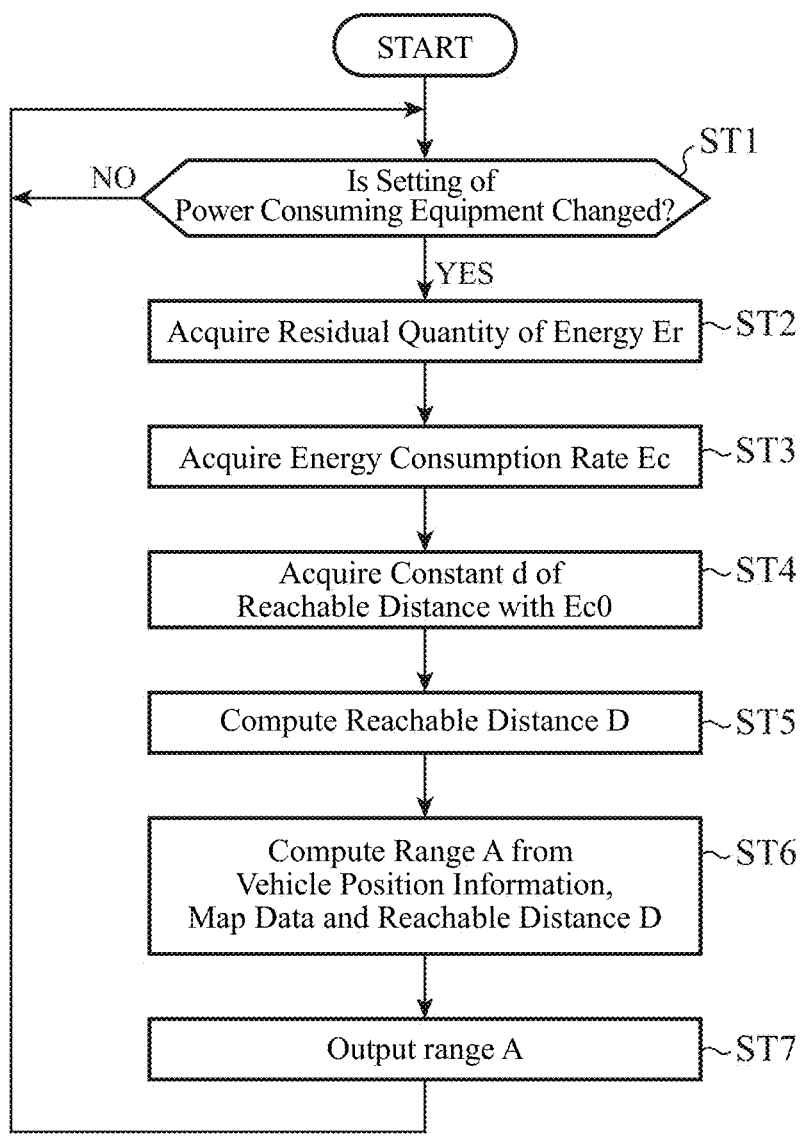
FIG. 6 is a flowchart showing the operation of the map display device of the embodiment 1.

Next, the operation of the map display device 10 will be described. FIG. 6 is a flowchart showing the operation of the range calculating unit of the map display device of the embodiment 1. Along the line of the flowchart of FIG. 6, the processing of computing the range will be described.

The range calculating unit 13 receives decision information on whether the setting of the power consuming equipment is changed or not, which the input analyzer unit 12 obtains by analyzing the operation input information of the user input unit 4, from the energy consumption rate acquiring unit 6 via the communication unit 9 (step ST1). If a decision is made at step ST1 that the setting of the power consuming equipment is not changed, the processing returns to step ST1 and waits. In contrast, if a decision is made at step ST1 that the setting of the power consuming equipment is changed, the reachable distance calculating unit 22 of the range calculating unit 13 acquires the remaining energy Er from the remaining energy acquiring unit 5 (step ST2), and obtains the energy consumption rate Ec from the energy consumption rate acquiring unit 6 (step ST3).

Here Ec, which is the sum of the energy consumption of the vehicle driving and of all the pieces of the power consuming equipment per unit time, is calculated by the following Expression (1).

$$Ec = Ec0 + \Sigma Eci (i=1-n) \quad \text{Exp. (1)}$$

Incidentally, Ec0 is the energy consumption (moving energy consumption) per unit time relating to the vehicle driving, Eci (i=1–n) is the energy consumption per unit time (referred to as a "driving energy consumption rate" from now on) required for driving the power consuming equipment, and n is the number of pieces of the power consuming equipment mounted on the vehicle. Here, as for the driving energy consumption rate of the power consuming equipment, it can be acquired directly from the power consuming equipment, or it can be acquired from a table that establishes the correspondence between the setting of the power consuming equipment and the driving energy consumption rate at the setting and is retained in advance.

Furthermore, the reachable distance calculating unit 22 acquires the constant d of the reachable distance at the moving energy consumption rate Ec0 relating to the vehicle driving from the driving efficiency storage unit 21 (step ST4).

Incidentally, although the constant d is a function of the gradient of a road and driving speed in general, it is explained as a fixed value for the sake of convenience. Next, the reachable distance calculating unit 22 calculates the reachable distance D while the power consuming equipment is used from the following Expression (2) (step ST5).

$$D = d \times (Er/Ec) \quad \text{Exp. (2)}$$

where the term (Er/Ec) in the foregoing Expression (2), which is the quotient obtained by dividing the remaining energy Er by the energy consumption rate Ec, represents endurance under the present power consuming condition. Multiplying the endurance (Er/Ec) in the present power consuming condition by the constant d results in D which is the reachable distance in the present power consuming condition. Incidentally, although the foregoing Expression (2) gives a simple calculation formula, to improve the accuracy of the reachable distance D, a calculation formula in more detailed conditions can be used.

The reachable area calculating unit 23 calculates the range A from the reachable distance D computed at step ST5 according to the vehicle position information supplied from the vehicle position calculating unit 11 and the map data acquired from the map data storage unit 3 (step ST6). The range A computed at step ST6 is supplied to the output control unit 14 (step ST7). After that, the flowchart returns to the processing at step ST1 to repeat the foregoing processing. In this way, every time it detects the change of the power consuming equipment, it computes the range A and displays it on the map data (see FIG. 4). Accordingly, it can inform the user of the range A dynamically changing in accordance with the energy consumption rate Ec of the vehicle.

Incidentally, in FIG. 2, the range calculating unit 13 can be configured in such a manner as to make a decision on whether the setting of the power consuming equipment is changed or not via the user input unit 4 by referring to the analysis information from the input analyzer unit 12. At this time, in FIG. 3, the input analyzer unit 12 supplies its information to the reachable distance calculating unit 22.

As described above, according to the present embodiment 1, since it comprises the reachable distance calculating unit 22 for calculating the reachable distance D considering the energy consumption of the power consuming equipment per unit time (driving energy consumption rate), it can display the range that reflects the setting of the power consuming equipment.

In addition, according to the present embodiment 1, since it is configured in such a manner as to comprise the range calculating unit 13 and output control unit 14 that calculate, every time the setting of the power consuming equipment is changed, the reachable distance D and range A and display them on the map data, it can display the range that follows the user operation of the power consuming equipment.

In addition, according to the present embodiment 1, since it is configured in such a manner that the reachable distance calculating unit 22 calculates the energy consumption rate Ec considering the energy consumption required for driving the power consuming equipment per unit time (driving energy consumption rate), it can display the range which reflects the setting of the power consuming equipment.

Incidentally, besides the display method shown in the foregoing embodiment 1, a configuration is also possible which displays the range at the operation of the power consuming equipment, followed by making the display of the range more inconspicuous after a fixed time period has elapsed from the end of the operation by removing the display, making it semitransparent or weakening its color. The configuration enables confirming the range when the power consuming equipment is operated, prevents the range from being displayed normally, and thus can provide the display with higher noticeability.

Embodiment 2

The present embodiment 2 shows a configuration that calculates a reachable point along a main road from the vehicle position according to the reachable distance D shown in the foregoing embodiment 1.

Figure 7:
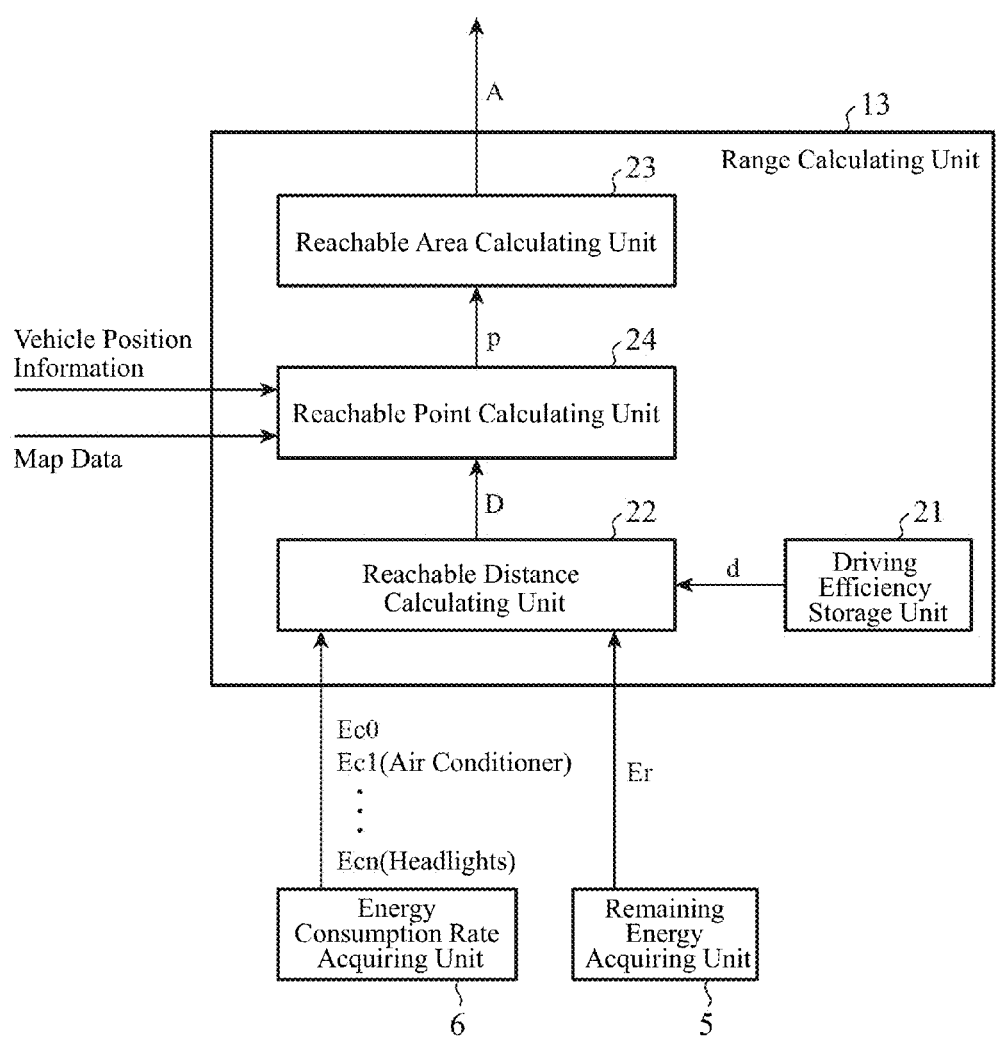
FIG. 7 is a block diagram showing a configuration of a range calculating unit of a map display device of an embodiment 2.

FIG. 7 is a block diagram showing a configuration of a map display device of the embodiment 2. The map display device 10 of the embodiment 2 further comprises in the range calculating unit 13 a reachable point calculating unit 24 for obtaining a reachable point from the reachable distance D the reachable distance calculating unit 22 calculates in addition to the configuration described in the foregoing embodiment 1 with reference to FIG. 1-FIG. 3. Incidentally, in the following description, the same or like components to those of the map display device 10 of the embodiment 1 are designated by the same reference numerals, and their description will be omitted or simplified.

The reachable point calculating unit 24 calculates a reachable point p from the reachable distance D according to the vehicle position information supplied from the vehicle position calculating unit 11 and the map data acquired from the map data storage unit 3. The reachable area calculating unit 23 computes the range A from the reachable point p. The range A can be given in terms of a route to the reachable point p or an area formed by connecting a plurality of reachable points p by lines. FIG. 8 shows a display example on the map display device of the embodiment 2. FIG. 8(a) shows a display of routes for driving to reachable points p1, p2, p3 and p4 along main roads from the vehicle position as the range A in a tree diagram. Since the roads are not a straight line, it is more limited than the range A shown in FIG. 5 of the embodiment 1. FIG. 8(b) shows a display of an area formed by connecting the reachable points p1, p2, p3 and p4 by straight lines as the range A.

Next, the operation will be described.

Figure 9:
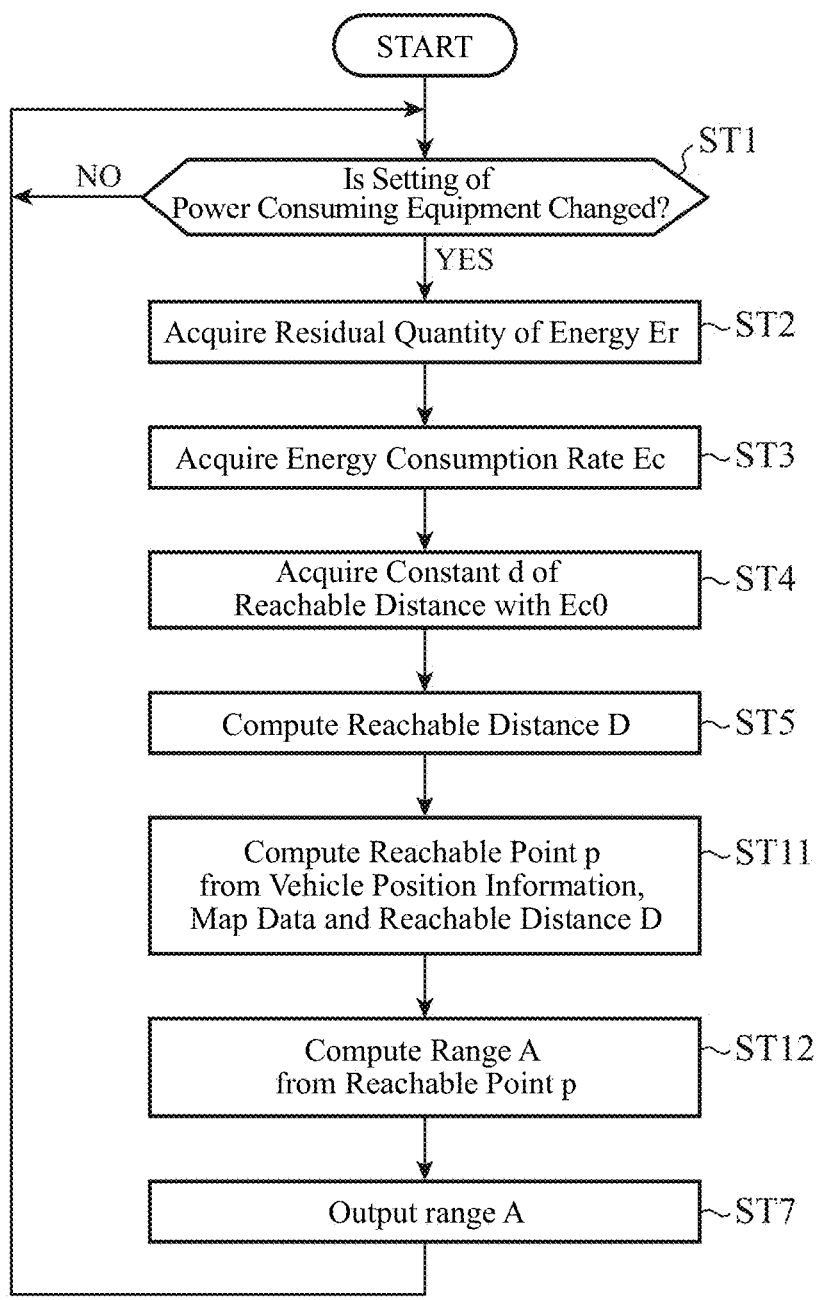
FIG. 9 is a flowchart showing an operation of the map display device of the embodiment 2.

FIG. 9 is a flowchart showing the operation of the map display device of the embodiment 2. Incidentally, in the following description, steps that perform the same processing as the processing shown in FIG. 6 of the embodiment 1 are designated by the same reference symbols, and their description will be omitted or simplified.

When the reachable distance calculating unit 22 computes the reachable distance D at step ST5, the reachable point calculating unit 24 computes the reachable points p (p1, p2, ..., pn) from the reachable distance D computed at step ST5 in accordance with the vehicle position information supplied from the vehicle position calculating unit 11 and the map data acquired from the map data storage unit 3 (step ST11). The reachable area calculating unit 23 computes the range A from the reachable points p calculated at step ST11 (step ST12), and supplies it to the output control unit 14 (step ST7).

Incidentally, in the processing at step ST12, the range A can be given by the tree diagram showing the routes to the reachable points p as shown in FIG. 8(a), or by the area formed by connecting the reachable points by the straight lines as shown in FIG. 8(b). Computing the reachable points in this way enables providing more accurate range A based on the reachable distance D.

Next, a configuration will be shown in which the reachable point calculating unit 24 computes the reachable points p considering the driving efficiency of an ordinary road and a motorway such as an expressway. Since a motorway without a signal can improve the fuel consumption, the reachable points p can be set at a more distant point. On the other hand, since the motorway has a restriction on a parking/stopping lot, it computes the reachable points p considering the parking/stopping lot.

Figure 10:
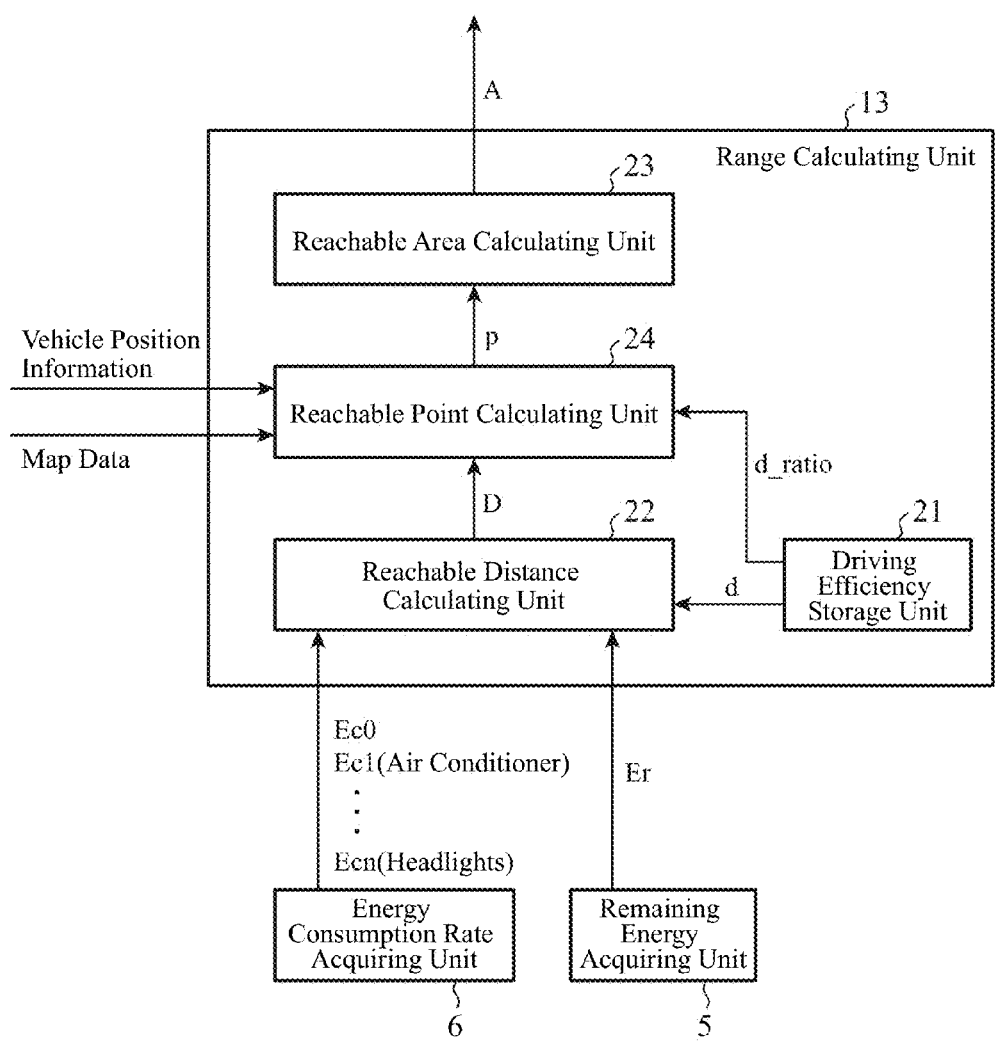
FIG. 10 is a block diagram showing a different configuration of the range calculating unit of the map display device of the embodiment 2.

FIG. 10 is a block diagram showing a configuration for calculating the reachable points considering a motorway in the map display device of the embodiment 2. It has the same configuration as the that of FIG. 7 described above, and furthermore, it acquires, when at least a part of a route to a reachable point p the reachable point calculating unit 24 computes includes a motorway, the driving efficiency ratio d_ratio between the motorway and ordinary road from the driving efficiency storage unit 21, and recalculates a reachable point p' considering the driving efficiency ratio d_ratio.

Figure 11:
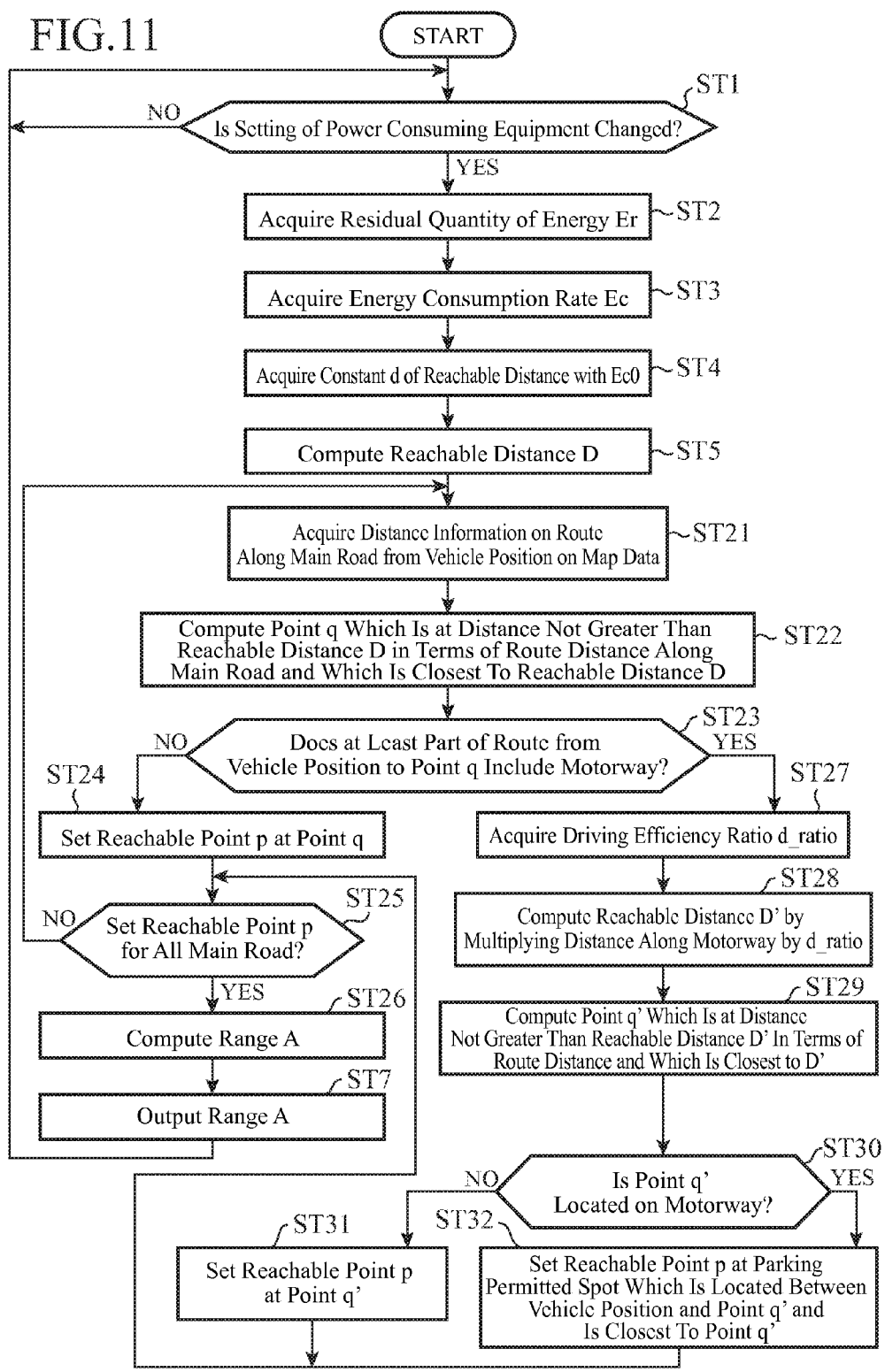
FIG. 11 is a flowchart showing a different operation of the map display device of the embodiment 2.

Next, the operation will be described. FIG. 11 is a flowchart showing the range display operation considering the driving efficiency of the ordinary road and motorway in the map display device of the embodiment 2.

When the reachable distance calculating unit 22 computes the reachable distance D at step ST5, the reachable point calculating unit 24 acquires the distance information on a route along a main road from the vehicle position on the map data in accordance with the vehicle position information supplied from the vehicle position calculating unit 11 and the map data acquired from the map data storage unit 3 (step ST21), and calculates a point q the distance to which along the main road is not greater than the reachable distance D and which is closest to the reachable distance D (step ST22).

Next, the reachable point calculating unit 24 decides on whether at least a part of the route from the vehicle position to the point q includes a motorway or not (step ST23). If it decides that the route does not include the motorway at step ST23, it supplies the point q it computes at step ST22 to the reachable area calculating unit 23 as the reachable point p (step ST24). After that, the reachable point calculating unit 24 decides on whether it calculates the reachable points p for all the main roads or not (step ST25), and if it decides at step ST25 that it does not calculate the reachable points p for all the main road, it returns to step ST21 to repeat the foregoing processing. On the other hand, if it decides at step ST25 that it calculates the reachable points p for all the main roads, the reachable area calculating unit 23 computes the range A from the reachable points p calculated (step ST26), and supplies it to the output control unit 14 (step ST7).

On the other hand, when it decides at step ST23 that the route includes a motorway, the reachable distance calculating unit 22 acquires the driving efficiency ratio d_ratio between the motorway and ordinary road from the driving efficiency acquiring unit 21 (step ST27). The driving efficiency ratio d_ratio can be calculated by the following Expression (3).

$$d\_ratio = (\text{driving efficiency of motorway driving})/(\text{driving efficiency } d \text{ of ordinary road driving}) \quad \text{Exp. (3)}$$

According to the following Expression (4), the reachable distance calculating unit 22 calculates a new reachable distance D' by multiplying the driving efficiency ratio d_ratio and the distance, by which the vehicle passes along the motorway on the route as to which a decision is made of including the motorway at step ST23 (step ST28).

$$\text{reachable distance } D' = \text{route distance on ordinary road } D\_ippan + d\_ratio \times \text{route distance on motorway } D\_senyou \quad \text{Exp. (4)}$$

Furthermore, the reachable distance calculating unit 22 calculates a point q', the route distance to which is not greater than the reachable distance D' and which is closest to the distance D' (step ST29). Then it decides on whether the point q' computed at step ST29 is on a motorway or not (step ST30). When it decides at step ST30 that the point q' is not on the motorway, it sets the point q' as a reachable point p (step ST31). On the other hand, when it decides at step ST30 that the point q' is on the motorway, it sets the reachable point p at a parking permitted spot that is located between the vehicle position and point q' and is closest to the point q' (step ST32). When the processing at step ST31 or step ST32 has been executed, the flowchart proceeds to the processing at step ST25.

Incidentally, as for the reachable point p at step ST32 when moving into a motorway, there is a case where it is set on an ordinary road considering a parking permitted spot, or a case where it is set at a parking permitted spot on the motorway such as an interchange, service area, or parking area.

Figure 12:
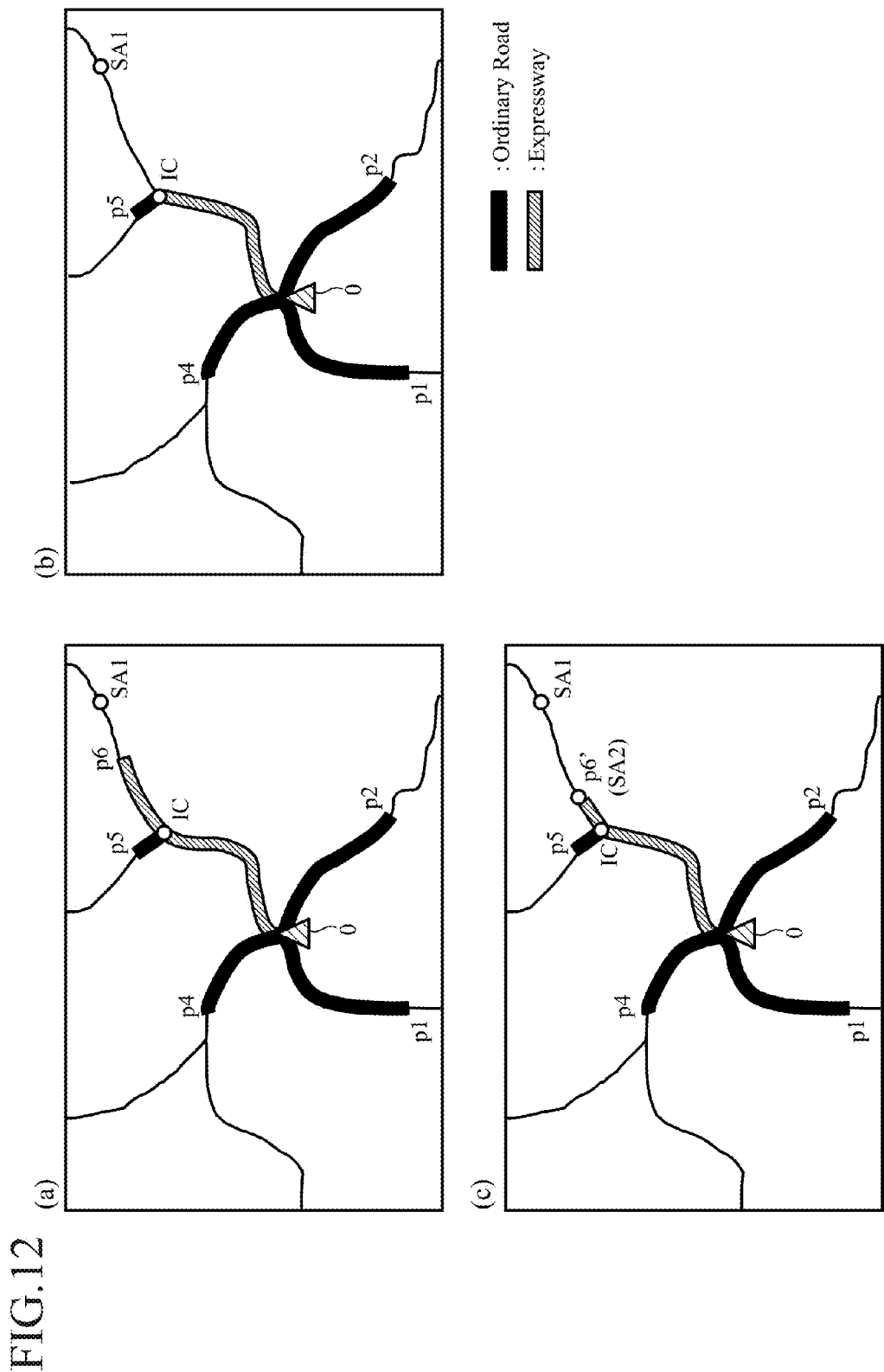
FIG. 12 is a diagram showing a different display example of a range by the map display device of the embodiment 2.

FIG. 12 shows a display example considering the driving efficiency of the ordinary road and motorway. Incidentally, in and after FIG. 12, the description will be made on the assumption that the motorway is an expressway. FIG. 12($a$) shows, considering the driving efficiency ratio d_ratio between an expressway and an ordinary road, routes from the vehicle position O to reachable points p1, p2, p4, p5 and p6 along main roads at a range A of a tree diagram. The reachable points p1, p2 and p4 are on an ordinary road and are the same as those shown in FIG. 8($a$). On the other hand, since the routes from the vehicle position O to the reachable points p5 and p6 include an expressway, the driving efficiency ratio d_ratio is considered, and the reachable points p5 and p6 are set at points more distant than the point p3 shown in FIG. 8($a$).

On the other hand, FIG. 12($b$) shows a case where although the reachable point p6 is on the expressway as shown in FIG. 12($a$), it is not a point at which stopping of a vehicle is legally possible such as an interchange or service area, and the range A is displayed with the point p6 being eliminated therefrom. Incidentally, since the reachable point p5 is on a route from the interchange to an ordinary road, it is included in the range A. In addition, as shown in FIG. 12($c$), when a parking/stopping permitted service area (SA2) exists on the expressway from the interchange to the reachable point p6, the service area (SA2) is included in the range A as a reachable point p6'.

As described above, according to the present embodiment 2, it is configured in such a manner as to calculate the reachable points P from the reachable distance D, thereby forming the range A as a tree diagram indicating the routes to the reachable points P or as an area by connecting the reachable points P. Accordingly, it can calculate the range from the reachable distance D at higher accuracy.

In addition, according to the present embodiment 2, it is configured in such a manner as to comprise the driving efficiency storage unit 21 for storing the driving efficiency, and as to calculate the reachable distance D considering the driving efficiency. Accordingly, it can calculate the range which reflects the driving environment of the vehicle.

Furthermore, according to the present embodiment 2, it is configured in such a manner that when the vehicle is traveling along the motorway and the reachable point p is on the motorway, it sets the reachable point p at a parking permitted spot. Accordingly, it can calculate the range using the legally parking permitted spot.

Embodiment 3

Figure 13:
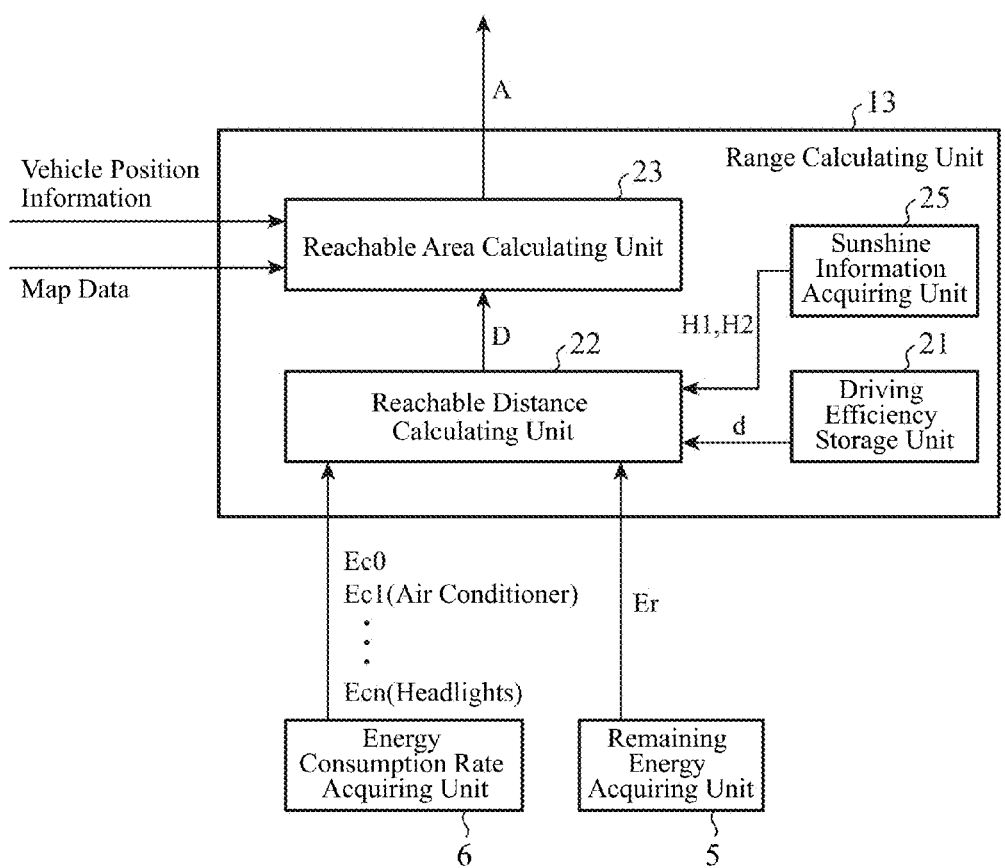
FIG. 13 is a block diagram showing a configuration of a range calculating unit of a map display device of an embodiment 3.

FIG. 13 is a block diagram showing a configuration of a range calculating unit of a map display device of the embodiment 3. The range calculating unit 13 of the present embodiment 3 has, in addition to the configuration described in the foregoing embodiment 1 with reference to FIG. 3, a sunshine information acquiring unit 25 for acquiring sunset time and sunrise time. Incidentally, in the following description, the same or like components to those of the map display device 10 of the embodiment 1 are designated by the same reference numerals used in the embodiment 1, and their description will be omitted or simplified.

The sunshine information acquiring unit 25 retains a sunshine database as shown in FIG. 14, for example, obtains the sunset time or sunrise time at the present vehicle position by referring to the sunshine database, and calculates time H1 from the present time to sunset or time H2 from the present time to dawn. FIG. 14($a$) is a sunset timetable which shows sunset time at a prescribed region for each day. FIG. 14($b$) is a sunrise timetable which shows sunrise time at a prescribed region for each day. In addition, as a different configuration of the sunshine information acquiring unit 25, it is also possible to acquire the sunset time or sunrise time at the present vehicle position by the communication unit 9 via a network.

The reachable distance calculating unit 22 calculates the reachable distance D using the energy consumption rate considering switching on or off of the headlights in accordance with the time H1 from the present time to sunset or the time H2 from the present time to dawn supplied from the sunshine information acquiring unit 25.

First, a case will be described in which the present time is before sunset and the headlights are switched on during driving after the sunset so that the energy consumption per unit time increases. In this case, the sunshine information acquiring unit 25 supplies the time H1 from the present time to sunset to the reachable distance calculating unit 22. The reachable distance calculating unit 22 calculates the reachable distance D that can be covered when the headlights are switched on after the time H1 according to the following Expression (5).

$$D = d \times H1 + d \times (Er - Ec \times H1)/(Ec + Ec\_\text{headlight}) \qquad \text{Exp. (5)}$$

where the foregoing Expression (5) is applied when driving is possible after the sunset, that is, when $Er - Ec \times H1 > 0$.

In the foregoing Expression (5), the term ($Er - Ec \times H1$) represents the remaining energy after driving time H1. In addition, the term Ec_headlight is an increase in the energy consumption per unit time due to lighting of the headlights, and the term (Ec+Ec_headlight) represents the energy consumption per unit time after time H1. By adding the energy consumption rate Ec_headlight of the headlights to the energy consumption rate $E_c$ during extinction of the headlights (that is, without the power consumption of the headlights), the energy consumption rate during lighting of the headlights after the sunset is given.

Incidentally, when the continuous driving becomes impossible before sunset (within the time H1), that is, when $Er - Ec \times H1 \leq 0$, the reachable distance D is calculated according to Exp. (2) given in the foregoing embodiment 1.

Next, a case will be described in which the present time is before dawn and the headlights are switched off during driving after the sunrise so that the energy consumption rate per unit time reduces. In this case, the sunshine information acquiring unit 25 supplies the time H2 from the present time to dawn to the reachable distance calculating unit 22. The reachable distance calculating unit 22 computes the reachable distance D that can be covered when the headlights are switched off after the time H2 according to the following Expression (6).

$$D = d \times H2 + d \times (Er - Ec \times H2)/(Ec - Ec\_\text{headlight}) \qquad \text{Exp. (6)}$$

where the foregoing Expression (6) is applied when driving is possible after the dawn, that is, when Er−Ec×H2>0.

In the foregoing Expression (6), the term (Er−Ec×H2) represents the remaining energy after driving time H2. In addition, the Ec_headlight is a decrease in the energy consumption rate due to extinction of the headlights, and the term (Ec−Ec_headlight) represents the energy consumption rate after the time H2. By subtracting the energy consumption rate Ec_headlight of the headlights from the energy consumption rate Ec during lighting of the headlights (that is, including the power consumption of the headlights), the energy consumption rate during extinction of the headlights after the sunrise is given.

Incidentally, when the continuous driving becomes impossible after the sunrise (within time H2), that is, when Er−Ec×H2≤0, the reachable distance D is calculated according to Exp. (2) given in the foregoing embodiment 1.

As in the foregoing embodiment 1, the reachable area calculating unit 23 calculates the range A from the reachable distance D the reachable distance calculating unit 22 calculates according to the vehicle position information supplied from the vehicle position calculating unit 11 and the map data acquired from the map data storage unit 3.

As described above, according to the present embodiment 3, it is configured in such a manner as to comprise the sunshine information acquiring unit 25 that includes the sunshine database and calculates the time (H1) from the present time to sunset or the time (H2) from the present time to dawn, and the reachable distance calculating unit 22 for calculating the reachable distance D using the energy consumption rate considering switching on or off of the headlights in accordance with the time from the present time to the sunset or from the present time to the dawn. Accordingly, it can present the range in accordance with the energy consumption rate changing dynamically in response to the lighting or extinction of the headlights.

Incidentally, although the present embodiment 3 shows a configuration in which the sunshine information acquiring unit 25 is added to the range calculating unit 13 shown in the embodiment 1, it can also be added to the range calculating unit 13 shown in the embodiment 2.

Embodiment 4

The present embodiment 4 shows a configuration that issues a warning to a user by changing the display of the reachable range on the display unit 8 when it becomes impossible to reach an interchange or a service area or parking area with energy supplying facilities, which was reachable but becomes unreachable because the user turns on the power or increases the level of the power consuming equipment during motorway driving. Incidentally, since the map display device 10 of the embodiment 4 has the same configuration as the foregoing embodiment 1 described with reference to FIG. 1 and FIG. 2 or the embodiment 2 described with reference to FIG. 7 or FIG. 10, its description will be omitted, and the following description will be made using the same reference numerals as the embodiment 1 and embodiment 2.

Figure 15:
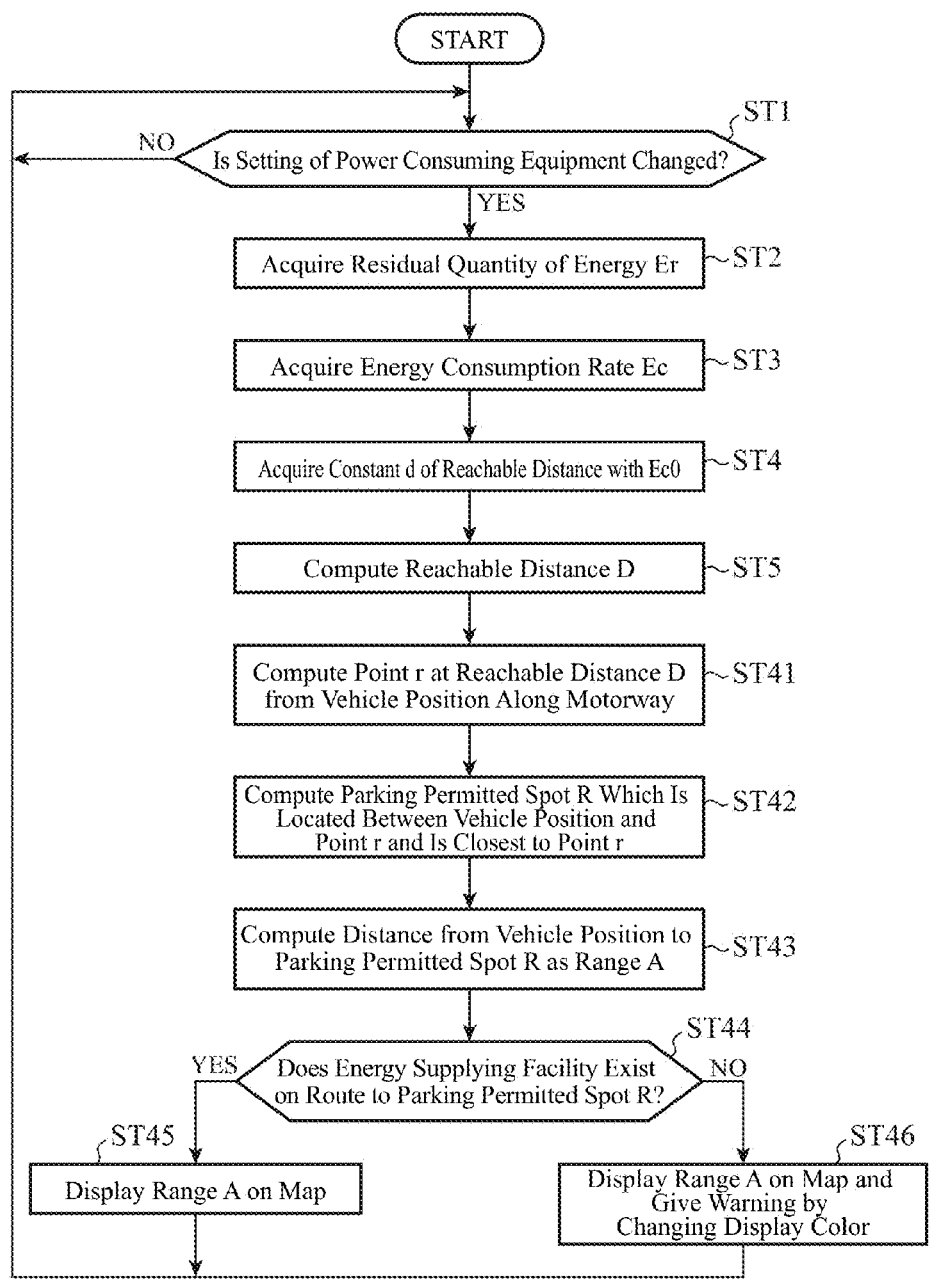
FIG. 15 is a flowchart showing an operation of the map display device of the embodiment 4.

Referring to the flowchart of FIG. 15, the operation of the map display device of the embodiment 4 will be described. Incidentally, in the flowchart of FIG. 15, steps that perform the same processing as the processing shown in FIG. 6 of the embodiment 1 are designated by the same reference symbols, and their description will be omitted or simplified.

When the reachable distance calculating unit 22 calculates the reachable distance D at step ST5, the reachable point calculating unit 24 computes the point r at the reachable distance D from the vehicle position along the motorway according to the vehicle position information supplied from the vehicle position calculating unit 11 and the map data acquired from the map data storage unit 3 (step ST41). Furthermore, the reachable point calculating unit 24 computes a parking permitted spot R which is between the vehicle position and the point r and is closest to the point r (step ST42), and computes the distance from the vehicle position to the parking permitted spot R as the range A (step ST43). The range A calculated is supplied to the output control unit 14 together with the map data.

The output control unit 14 decides on whether an energy supplying facility exists on the route to the parking permitted spot R within the range A by referring to the map data (step T44). When it decides at step ST44 that an energy supplying facility exists on the route to the parking permitted spot R, it displays on the map the range A together with the display mark of the energy supplying facility (step ST45). On the other hand, when it decides at step ST44 that no energy supplying facility exists on the route to the parking permitted spot R, it displays the range A on the map and gives a warning display indicating that it is impossible to reach the energy supplying facility by changing the display of the range A (step ST46). After that, the flowchart returns to the processing at step ST1 to repeat the foregoing processing.

Figure 16:
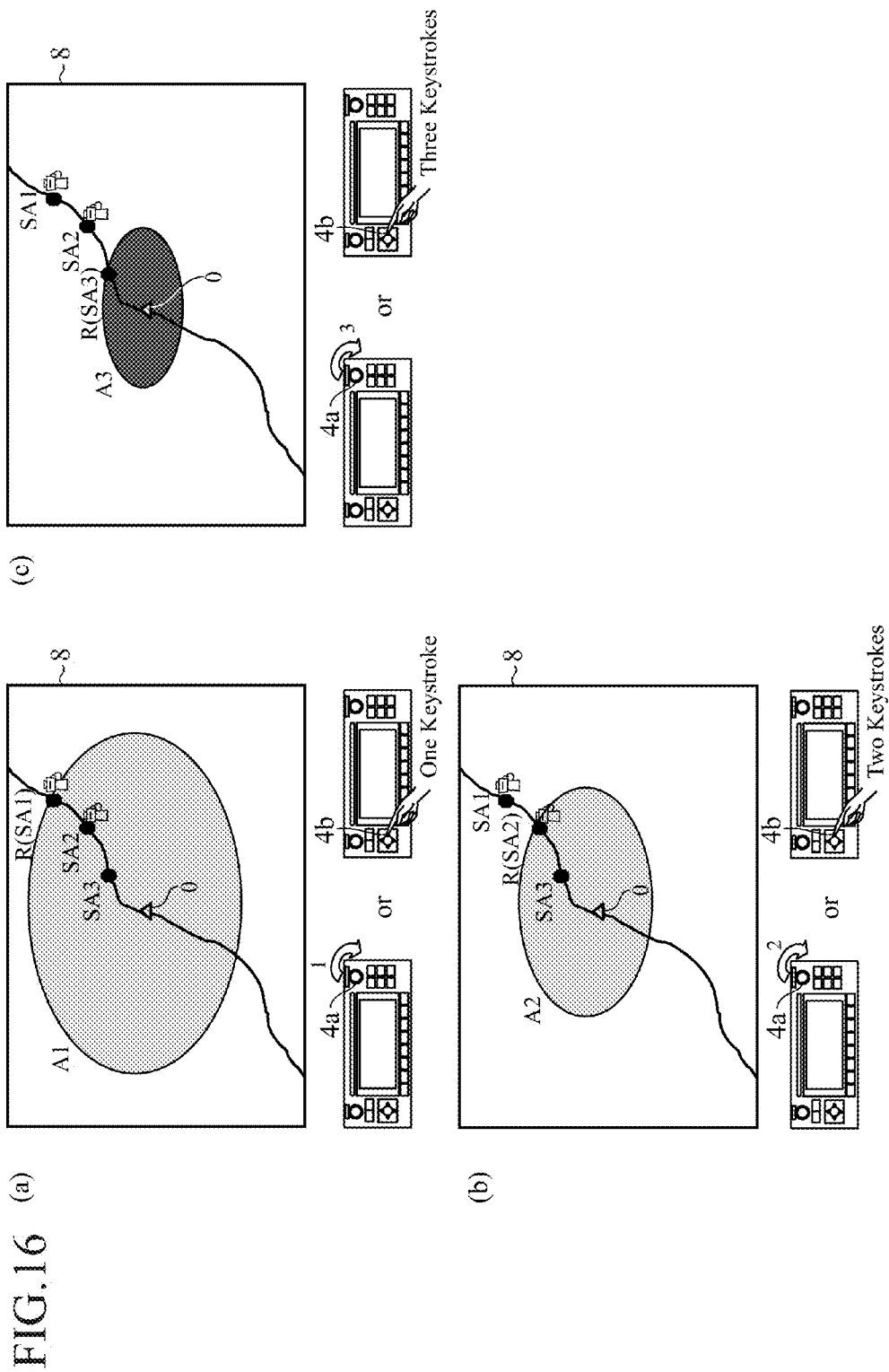
FIG. 16 is a diagram showing a display example of a range of the map display device of the embodiment 4.

FIG. 16 shows a display example of the range A corresponding to a setting level of the power consuming equipment and a display example of a warning based on the presence or absence of an energy supplying facility. Incidentally, in FIG. 16 and the following explanation, the description will be made of an example that makes a decision on whether there is a charging facility or not before the parking permitted spot R during driving of an electric vehicle along the expressway which is a motorway. In addition, FIG. 16 shows a map display screen on the display unit 8 when switching the setting level of the power consuming equipment at three steps.

FIG. 16(a) shows a display example when placing the setting level of the power consuming equipment at "1" with the dial 4a or button 4b which is the user input unit 4. When the setting level is "1", the parking permitted spot R computed by the reachable point calculating unit 24 is a service area (abbreviated to "SA" from now on) 1, and there are two charging facilities at SA1 and SA2 on the route to the SA1. Accordingly, the display unit 8 displays the range A1 from the vehicle position O to SA1 and the display marks of the charging facilities at SA1 and SA2. In this case, since the charging facility exists before the parking permitted spot R, the warning of changing the display of the range A1 is not given.

FIG. 16(b) shows a display example when placing the setting level of the power consuming equipment at "2" with the dial 4a or button 4b. When the setting level is "2", the parking permitted spot R computed by the reachable point calculating unit 24 is SA2, and there is one charging facility at the SA2 on the route to the SA2. Accordingly, the display unit 8 displays the range A2 from the vehicle position O to the SA2 and the display mark of the charging facility at SA2. In this case, since the charging facility exists before the parking permitted spot R, the warning of changing the display color of the range A2 is not given.

FIG. 16(c) shows a display example when placing the setting level of the power consuming equipment at "3" with the dial 4a or button 4b. When the setting level is "3", the parking permitted spot R computed by the reachable point calculating unit 24 is SA3, and there is no charging facility on the route to the SA3. Accordingly, the display unit 8 displays the range A3 from the vehicle position O to the SA3, and gives a warning of being unable to reach the charging facility by changing the display color of the range A3 to red, for example, or by turning the region on and off. This enables the user to recognize that he or she cannot arrive at the charging facility when continuing the driving with the power consuming equipment being used at the setting level 3.

Figure 17:
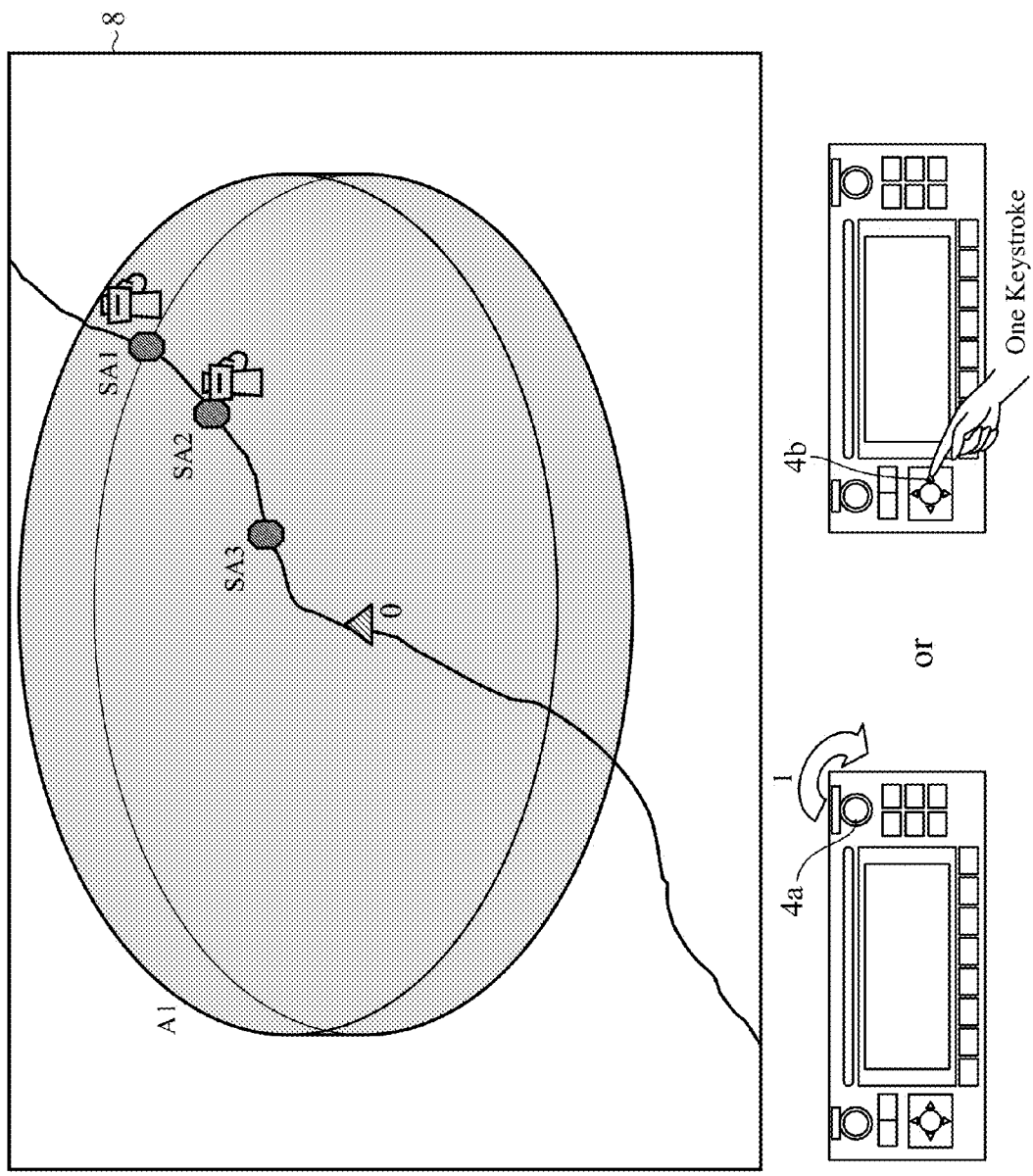
FIG. 17 is a diagram showing a different display example of the range of the map display device of the embodiment 4.

Alternatively, as shown in FIG. 17, the range A1 can be displayed cylindrically in a three-dimensional fashion. Alternatively, although not shown in a drawing, the range A can be displayed in a cone with its vertex being the vehicle position O. The cone protrudes most at the vehicle position O and its height reduces in accordance with the distance from the vehicle position O. In other words, the height of a particular point on the cone corresponds to the remaining energy of the vehicle. Thus, the user can recognize the reduction in the remaining energy due to driving from the cone. Furthermore, as another configuration, it can display an area other than the range A in a semitransparent manner.

As described above, according to the present embodiment 4, it is configured in such a manner as to comprise the reachable distance calculating unit 22 for computing the point r at the reachable distance D from the vehicle position along the motorway and for calculating the parking permitted spot R closest to the point r between the vehicle position and the point r, and the output control unit 14 for altering the display of the range A depending on whether there is an energy supplying facility on the route to the parking permitted spot R. Accordingly, a user can make a quick decision on whether he or she can drive to the energy supplying facility at the present setting of the power consuming equipment.

Incidentally, although the foregoing embodiment 4 is explained using an example of driving along the motorway, it is also applicable to the driving along an ordinary road.

In addition, the configuration of the foregoing embodiment 4 can be added to the map display device 10 shown in the embodiment 3.

Embodiment 5

The present embodiment 5 shows a configuration which stores a regular driving route as a circular route and displays a driving capable route and a driving incapable route separately from the reachable distance D the reachable distance calculating unit 22 calculates. For example, a visiting care service vehicle travels a plurality of regular routes every day and returns to a start point. Supposing such a use, a configuration will be shown which gives a warning display for a circular route that will disable returning to a start point among the circular routes stored, considering the remaining energy, temperature (setting of an air conditioner), weather (setting of wipers) and time (setting of headlights).

Figure 18:
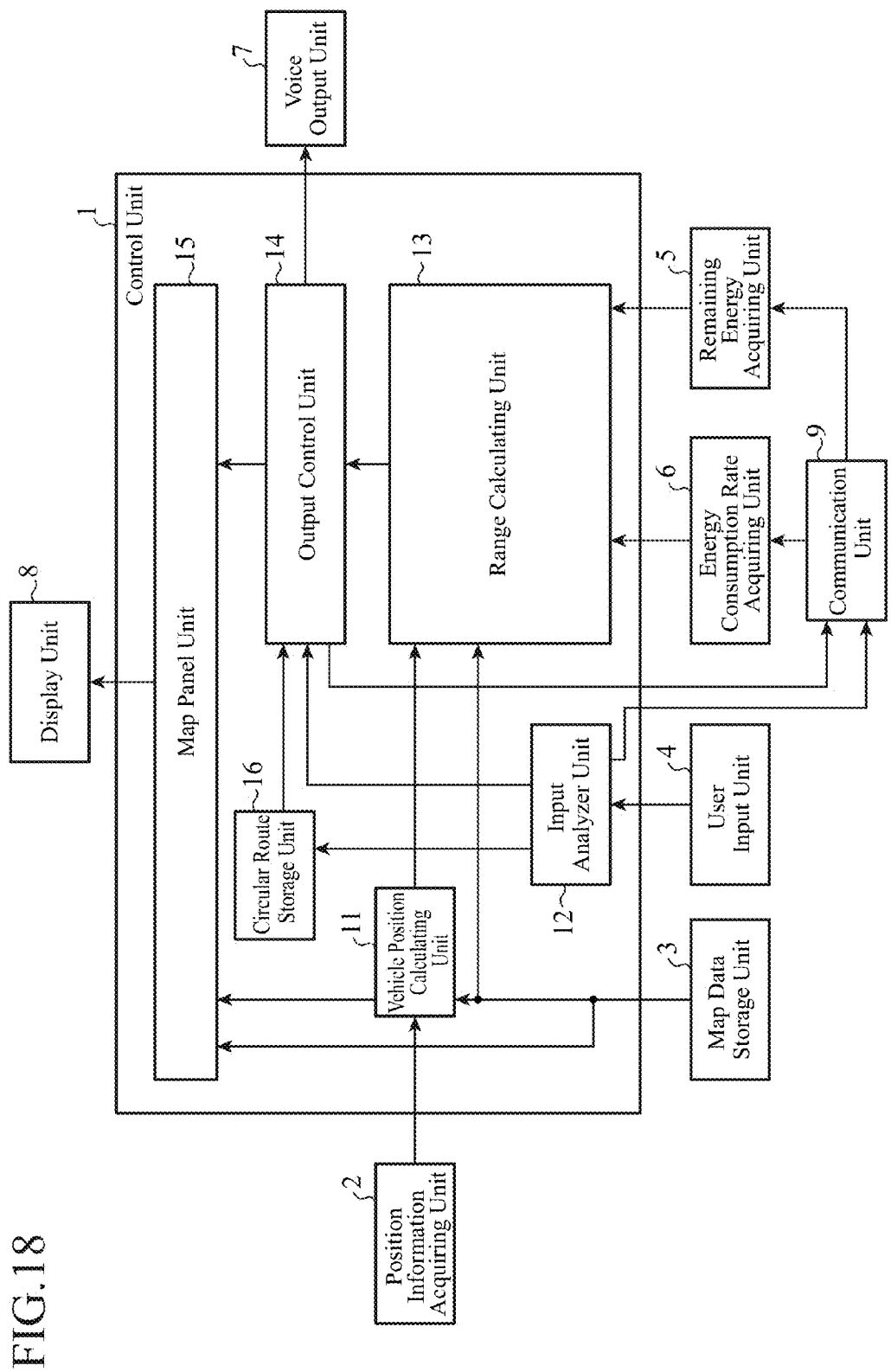
FIG. 18 is a block diagram showing a configuration of a control unit of a map display device of an embodiment 5.
Figure 19:
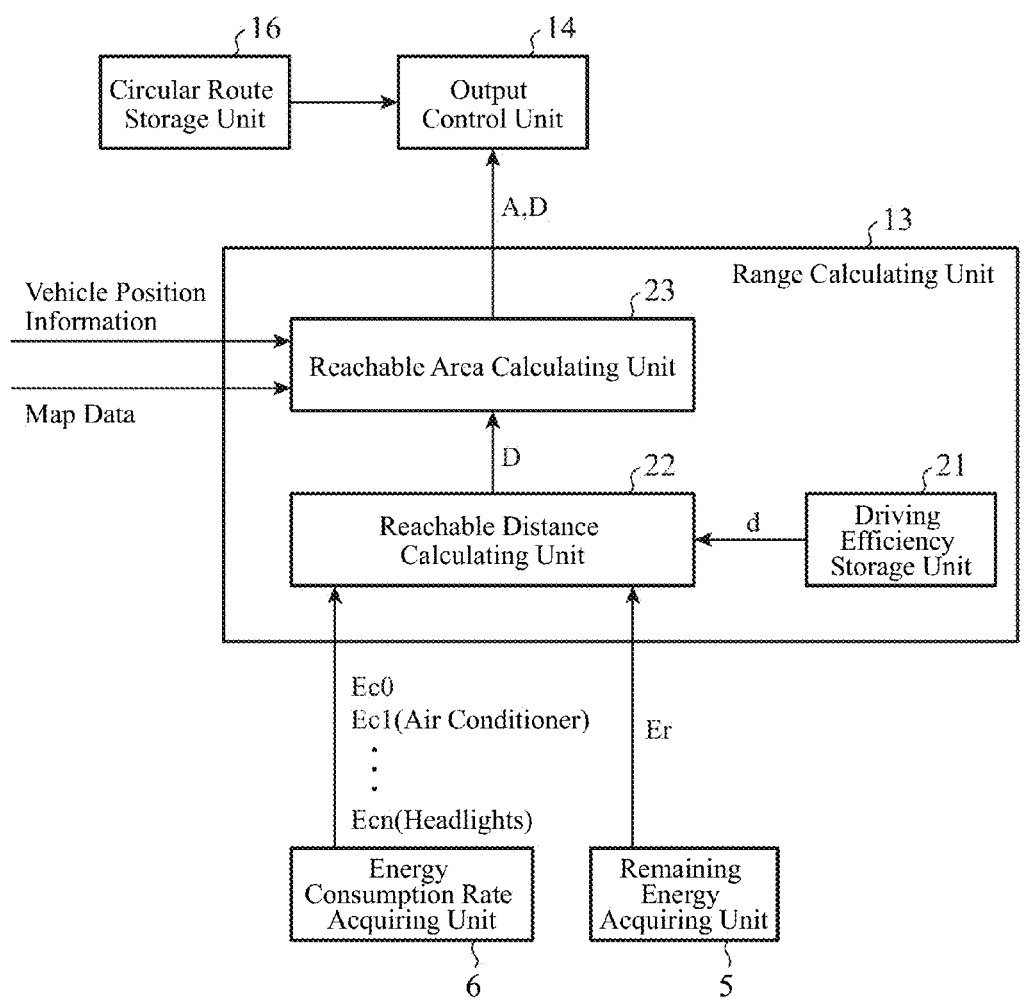
FIG. 19 is a block diagram showing a configuration of a range calculating unit of the map display device of the embodiment 5.

FIG. 18 and FIG. 19 are block diagrams showing a configuration of the map display device of the embodiment 5. The map display device 10 of the embodiment 5 comprises the configuration as described in the foregoing embodiment 1 with reference to FIG. 1-FIG. 3, and in addition the control unit 1 has a circular route storage unit 16 for storing regular driving routes. Incidentally, in the following description, the same or like components to those of the map display device 10 of the embodiment 1 are designated by the same reference numerals as those used in the embodiment 1, and their description will be omitted or simplified.

The circular route storage unit 16 stores circular routes input via the user input unit 4 and distances of the circular routes in advance. When a mode for deciding circular route driving is selected via the user input unit 4, it supplies the circular route and its distance stored to the output control unit 14. In addition, the range calculating unit 13 estimates power consuming equipment to be used according to the temperature, weather and present time which are input via the user input unit 4 or acquired from the network via the communication unit 9. In addition, the range calculating unit 13 has the driving energy consumption rate of the power consuming equipment in advance as a database, and calculates by referring to the database the energy consumption per unit time required for driving the power consuming equipment estimated to be used (referred to as "estimated driving energy consumption rate" from now on).

The reachable distance calculating unit 22 computes the reachable distance D from the remaining energy Er obtained from the remaining energy acquiring unit 5, the estimated driving energy consumption rate of the power consuming equipment expected to be used, which is computed by the range calculating unit 13, and the moving energy consumption rate relating to the driving of the vehicle, which is acquired from the energy consumption rate acquiring unit 6. The reachable distance D computed is supplied to the output control unit 14 via the reachable area calculating unit 23.

The output control unit 14 compares the distance of the circular route supplied from the circular route storage unit 16 with the reachable distance D, and decides on whether the circular route driving is possible or not. When the distance of the circular route is not greater than the reachable distance D, it decides that the vehicle can return to the start point, and carries out display control of the circular route in the same manner as an ordinary route. In contrast, when the distance of the circular route is longer than the reachable distance D, it decides that the vehicle cannot return to the start point, and carries out warning display control of the circular route (displays in a dotted line or red color).

Figure 20:
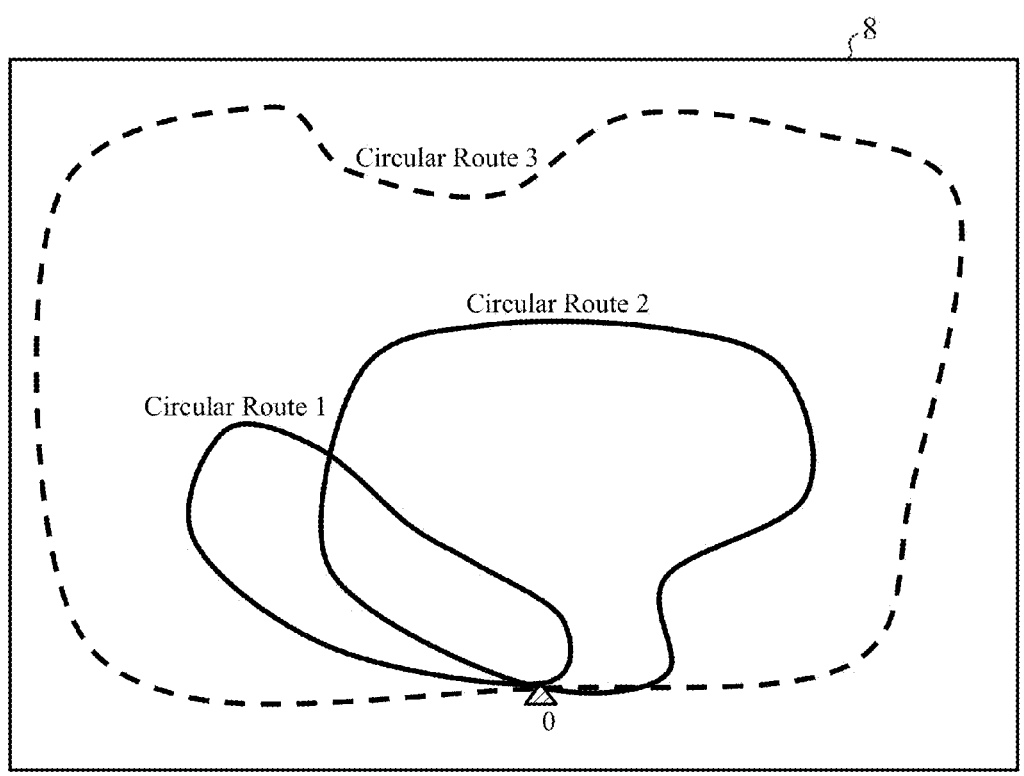
FIG. 20 is a diagram showing a display example of a circular route on the map display device of the embodiment 5.

FIG. 20 is a diagram showing a display example of the circular routes of the map display device of the embodiment 5. For example, it shows a case where the circular route storage unit 16 stores three coverable circular routes 1, 2 and 3 when the remaining energy of the vehicle is 100%, and where the vehicle cannot return to the start point of the circular route 3 with the longest distance when the present remaining energy of the vehicle is 70%. The circular route 3 is displayed in a dotted line so as to give a user a warning that the vehicle cannot return to the start point through the circular route 3.

Figure 21:
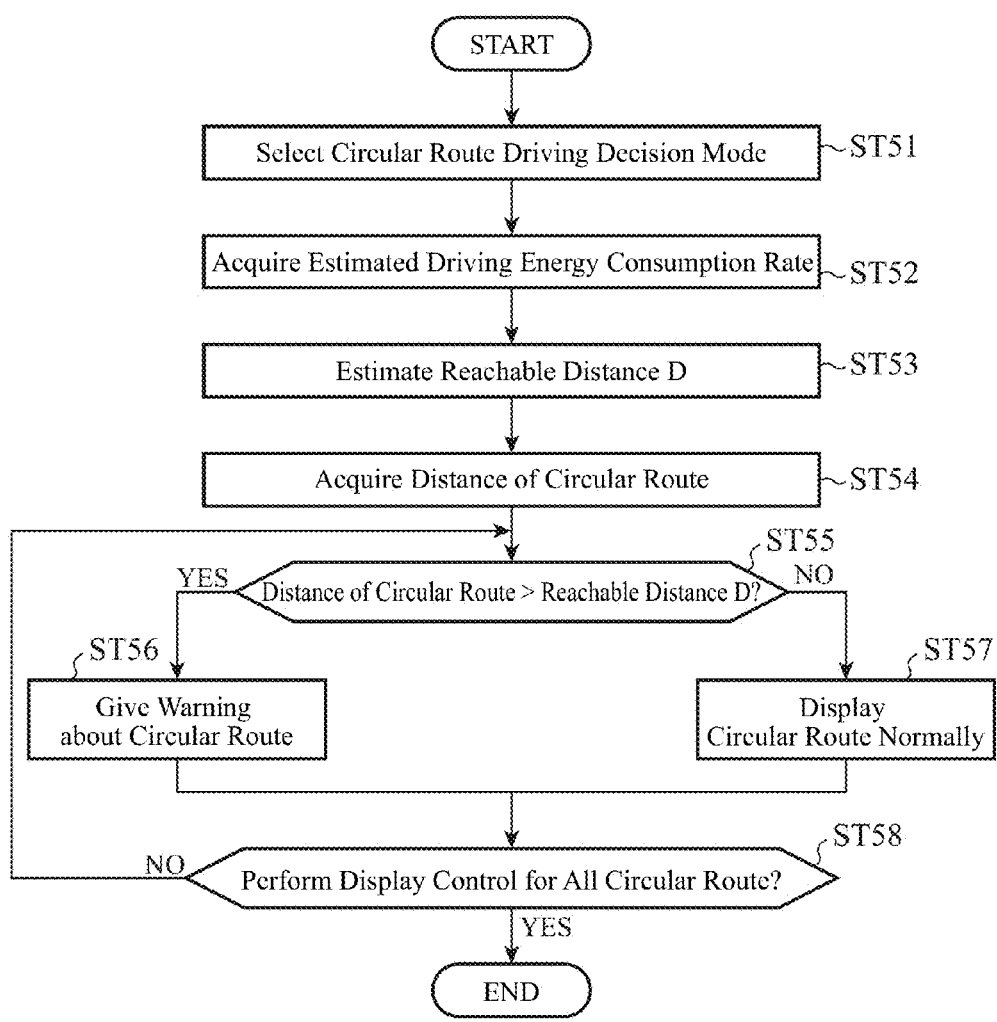
FIG. 21 is a flowchart showing the operation of the map display device of the embodiment 5.

Next, the operation will be described of making a decision as to whether the driving through the circular route is possible or not with reference to the flowchart of FIG. 21.

When the mode of making a decision as to the circular route driving is selected via the user input unit 4 (step ST51), the range calculating unit 13 acquires the present position of the vehicle which is computed from the vehicle position information, and the estimated driving energy consumption rate of the power consuming equipment expected to be used from surrounding conditions of the present position (step ST52).

The reachable distance calculating unit 22 estimates the reachable distance D from the remaining energy Er acquired from the remaining energy acquiring unit 5, the estimated driving energy consumption rate of the power consuming equipment expected to be used, which is acquired at step ST52, and the moving energy consumption rate relating to the driving of the vehicle acquired from the energy consumption rate acquiring unit 6 (step ST53), and supplies the reachable distance D to the output control unit 14 via the reachable area calculating unit 23. The output control unit 14 acquires the circular route and the distance of the circular route from the circular route storage unit 16 (step ST54), and makes a decision on whether the distance of the circular route is longer than the reachable distance D or not (step ST55).

If a decision is made at step ST55 that the distance of the circular route is longer than the reachable distance D, it carries out the display control of giving a warning about the circular route (step ST56). On the other hand, if a decision is made at step ST56 that the distance of the circular route is not greater than the reachable distance D, it carries out the control of displaying the circular route in the same manner as the ordinary route (step ST57). After that, the output control unit 14 makes a decision on whether it carries out the display control for all the circular routes (step ST58), and if it decides that all the circular routes are subjected to the decision, it terminates the processing. On the other hand, unless all the circular routes undergo the decision, the processing returns to step ST55 to repeat the foregoing processing.

As described above, according to the present embodiment 5, it is configured in such a manner as to comprise the circular route storage unit 16 for storing the circular routes in advance, and the output control unit 14 for carrying out the warning display indicating that the circular route cannot be covered when the distance of the circular route is longer than the reachable distance D estimated. Accordingly, it can provide a user with a route capable of traveling in accordance with the present remaining energy and the power consuming equipment expected to be used. This enables the user to select the route capable of traveling positively and easily.

In addition, according to the present embodiment 5, since it is configured in such a manner as to make a decision on whether the circular route driving is possible or not according to the estimated driving energy consumption rate of the power consuming equipment expected to be used in accordance with the surrounding conditions such as the temperature, weather and time, it can make a more accurate driving decision in conformity with the surrounding conditions at the driving.

Incidentally, as for the database indicating the driving energy consumption rate of the power consuming equipment, although the foregoing embodiment 5 shows a configuration in which the range calculating unit 13 includes the database, a configuration is also possible in which the reachable distance calculating unit 22 includes the database.

Incidentally, the foregoing configuration can also be applied to the map display device 10 shown in the embodiment 2.

Embodiment 6

The present embodiment 6 gives various descriptions of the configuration of the output control unit 14.

First, FIG. 22 shows an example which varies the display speed of the range A in conformity with the operation speed of the user input unit 4. When changing the setting level of the power consuming equipment from 1 to 3 via the user input unit 4, the speed of altering the range A is controlled in accordance with a feeling of the operation of the user input unit 4 (such as rotating the dial or pushing the button).

Referring to FIG. 22(*a*) to FIG. 22(*c*), it will be described concretely. When the user input unit 4 is a dial 4*a* as shown in FIG. 22(*a*) and the setting level is changed from 1 to 3 by rotating the dial 4*a*, the rotation speed of the dial 4*a* varies as shown in FIG. 22(*b*). The moving speed is zero near the setting level 1 (time T0), increases toward the setting level 2 as the dial 4*a* is rotated, reduces near the setting level 2 (time T1), and becomes zero at the setting level 2 (time T1 to T2), thereby stopping the rotation of the dial 4*a*. Likewise, the dial 4*a* increases toward the setting level 3, and the moving speed reduces near the setting level 3 (time T3) and becomes zero when arriving at the setting level 3, thereby stopping the rotation of the dial 4*a*.

The display speed of the range A is also altered as the speed variation of FIG. 22(*b*). As shown in FIG. 22(*c*), when changing from the range A1 corresponding to the setting level 1 of the user input unit 4 to the range A3 corresponding to the setting level 3, the area is reduced by increasing the speed from time T0 to time T1 of the range A1, and the reduction in the range stops from the time T1 to time T2 which is the outermost circumference of the range A2. After that, the area is reduced again by increasing the speed from time T2 to time T3 of the range A2, and the variation stops when reaching the time T3 which is the outermost circumference of the range A3.

In this way, noticeability of the map display is improved by carrying out display control in conformity with the operation feeling of the user input unit 4. Besides, in addition to the foregoing configuration, a configuration can also be provided which stops the variation of the range A for a moment at an important point on the map display such as a destination of the vehicle. This enables the user to readily recognize the important point on the map display.

As still another display control method, a configuration will be shown which displays the setting of the power consuming equipment in relation to the presence or absence of an energy supplying facility. Incidentally, although the following description will be made using an air conditioner as an example of the power consuming equipment, it is applicable to the setting of the power consuming equipment such as audio equipment which does not have an influence on the vehicle driving.

When the air conditioner is selected as the power consuming equipment via the user input unit 4 (see FIG. 23(*a*)), as shown in FIG. 23(*b*) are displayed a display mark of a charging facility which is an energy supplying facility and a range A corresponding to each setting temperature of the air conditioner. In the example of FIG. 23(*b*), when the setting temperature is fixed at 27 degrees to 29 degrees, since at least one charging facility exists within the range A (27 degrees), A (28 degrees) and A (29 degrees), the range A (27 degrees), A (28 degrees) and A (29 degrees) are displayed in a blue color, for example. On the other hand, when the setting temperature is fixed at 26 degrees, since the vehicle cannot reach the first charging facility placed at SA3, the range A (26 degrees) at the setting temperature 26 degrees is displayed in a red color which indicates a warning, for example, and a message for a user is displayed such as "Recommend to fix setting temperature at 27 degrees and over", thereby proposing to fix the setting temperature of the air conditioner at 27 degrees and up. According to this, the user decides the setting temperature of the air conditioner by confirming the range A displayed, the warning display or display message.

Figure 24:
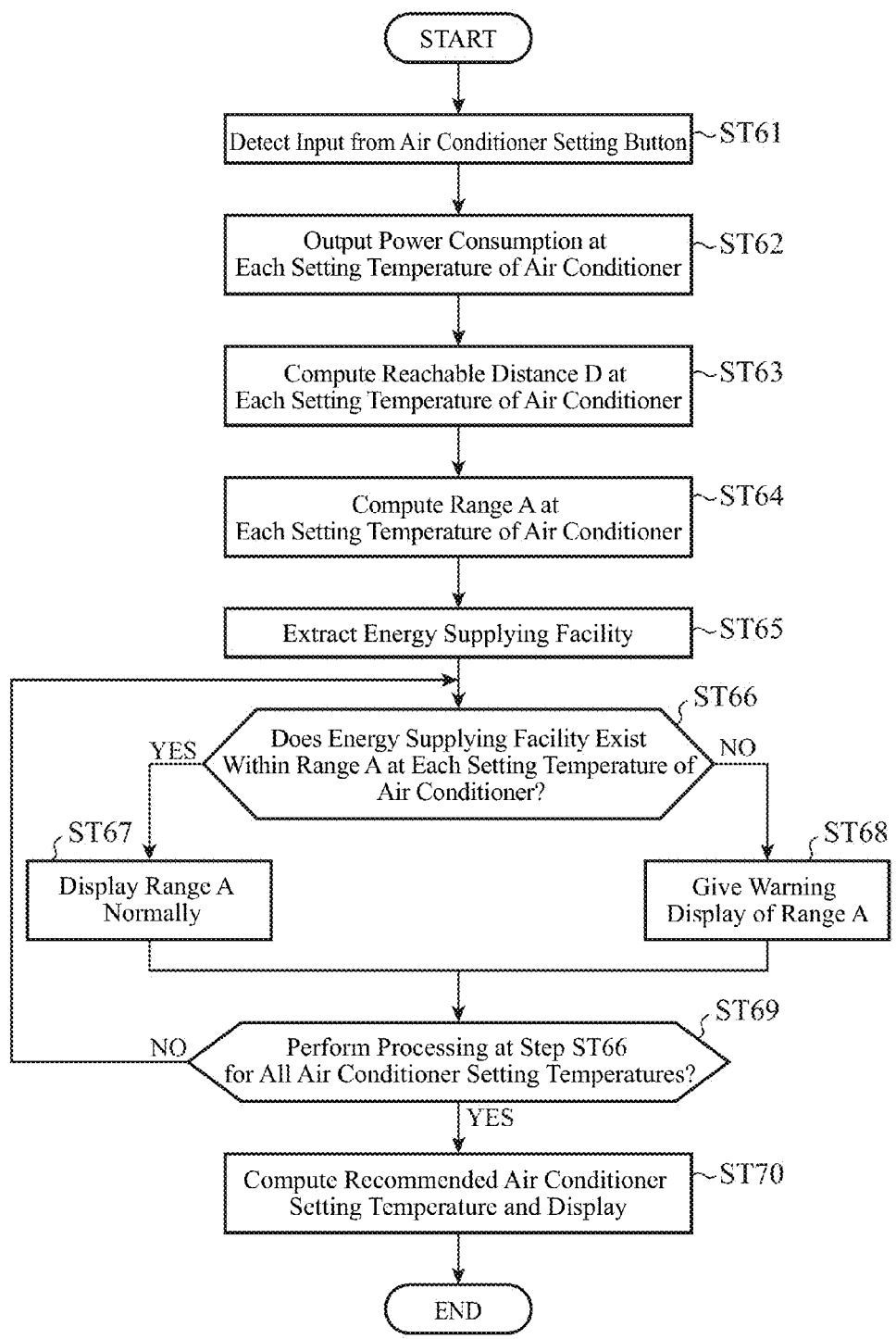
FIG. 24 is a flowchart showing an operation of the map display device of the embodiment 6.

The processing operation of displaying the setting of the air conditioner in relation to the presence or absence of the energy supplying facility will be described with reference to flowcharts of FIG. 24 and FIG. 25.

When the range calculating unit 13 detects an input from the setting button (not shown) of the air conditioner (step ST61), it supplies the reachable distance calculating unit 22 with the driving energy consumption rate at each setting temperature of the air conditioner, which is retained in advance (step ST62). The reachable distance calculating unit 22 computes the reachable distance D at each setting temperature of the air conditioner from the driving energy consumption rate at each setting temperature of the air conditioner supplied at step ST62, the remaining energy Er acquired from the remaining energy acquiring unit 5 and the moving energy consumption rate concerning the vehicle driving acquired from the energy consumption rate acquiring unit 6 (step ST63). The reachable area calculating unit 23 computes the range A based on the reachable distance D calculated at step ST63 (step ST64). The computed range A is supplied to the output control unit 14 together with the map data.

The output control unit 14 extracts an energy supplying facility by referring to the map data (step ST65), and decides on whether a reachable energy supplying facility exists within the range A corresponding to each setting temperature of the air conditioner or not (step ST66). If it decides that an energy supplying facility exists within the range A corresponding to the setting temperature of the air conditioner at step ST66, it displays the range A together with the display mark of the energy supplying facility (step ST67). On the other hand, if it does not decide that an energy supplying facility exists within the range A corresponding to the setting temperature of the air conditioner at step ST66, it gives a warning display of the range A (step ST68).

After that, the output control unit 14 makes a decision as to whether the processing at step ST66 is performed for all the air conditioner setting temperatures or not (step ST69). When it decides that it completes the processing for all the air conditioner setting temperatures at step ST69, it computes the air conditioner setting temperature to be recommended by referring to the processing result at step ST66, and carries out display control for showing the recommended setting temperature in a message (step ST70). On the other hand, when it does not decide that it completes the processing for all the air conditioner setting temperatures at step ST69, it returns the processing to step ST66 to repeat the foregoing processing.

Incidentally, since the power consumption of the air conditioner is determined by the setting temperature of the air conditioner here, it is assumed that the range calculating unit 13 has the driving energy consumption rates corresponding to the individual setting temperatures in advance as a database. In addition, a configuration is also possible in which the reachable distance calculating unit 22 has the database.

Figure 25:
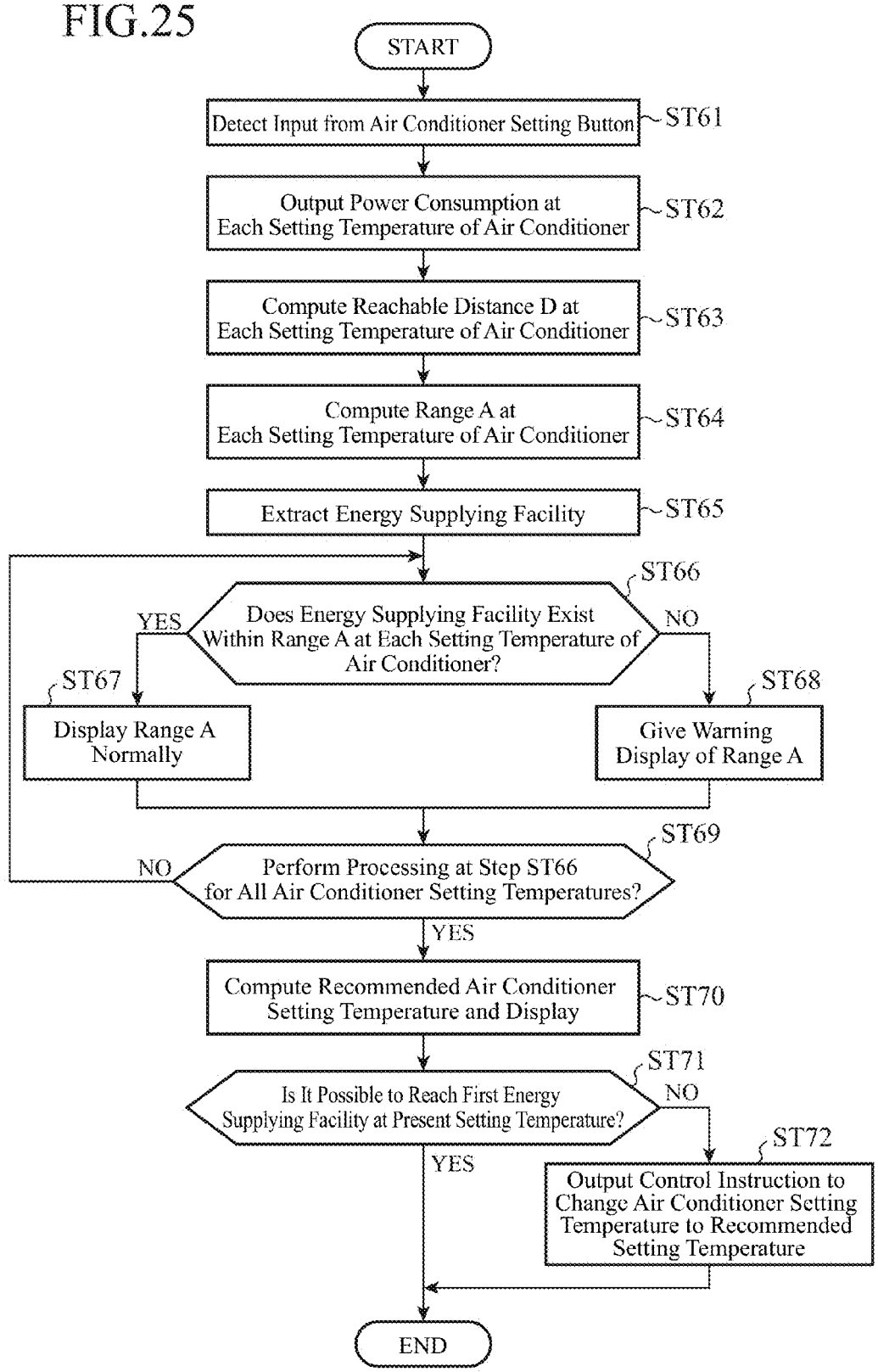
FIG. 25 is a flowchart showing a different operation of the map display device of the embodiment 6.

As still another configuration, as shown in the flowchart of FIG. 25, the output control unit 14 acquires, after computing and displaying the recommended air conditioner setting temperature at step ST70, the setting temperature of the air conditioner which is controlled by a vehicle control unit (not shown) via the communication unit 9, and decides on whether the vehicle can reach the closest energy supplying facility from the present position at the setting temperature or not (step ST71). If it decides at step ST71 that the vehicle cannot reach, it supplies the recommended air conditioner setting temperature computed at step ST70 to the vehicle control unit via the communication unit 9 as a control instruction (step ST72). On the other hand, if it decides at step ST71 that the vehicle can reach, it terminates the processing without any control of the air conditioner.

The vehicle control unit, which receives the control instruction at step ST72, fixes the setting temperature of the air conditioner at the recommended temperature. This makes it possible to automatically control the air conditioner at the recommended temperature.

In this way, the present embodiment can provide a warning display for the setting temperature which will prevent the vehicle from arriving even at the closest energy supplying facility to the present position, and can inform the user of the recommended air conditioner setting temperature. In addition, it can automatically control the setting temperature of the air conditioner at the temperature which will enable the vehicle to reach the energy supplying facility. Furthermore, it is not limited to the air conditioner, but a configuration is also possible which automatically controls the setting of the power consuming equipment that does not affect the vehicle driving in conformity with the decision result on whether the vehicle can reach an energy supplying facility. When carrying out the automatic control, a configuration is also possible which informs the user of carrying out the automatic control such as releasing the warning display.

As described above, according to the present embodiment 6, since it is configured in such a manner that the output control unit 14 carries out the display control of the range A in conformity with an operation feeling of the user input unit 4, it can display the range A in connection with the operation of the user input unit 4. This enables the user to readily recognize the changes in the range A according to the setting of the power consuming equipment.

In addition, according to the present embodiment 6, it is configured in such a manner that the range calculating unit 13 computes the range A corresponding to each setting temperature of the air conditioner, and that the output control unit 14 makes a decision as to whether an energy supplying facility exists within the range A at each setting temperature of the air conditioner, and gives, when it does not exist, a warning display of the range A to inform a user of the recommended air conditioner setting temperature. Accordingly, the user can readily recognize the air conditioner setting temperature that will enable the vehicle to reach the energy supplying facility. Incidentally, as for power consuming equipment other than the air conditioner, the recommended setting can also be informed so as to achieve the same advantage.

Furthermore, according to the present embodiment 6, since it is configured in such a manner as to supply the recommended setting temperature of the air conditioner to the vehicle control unit via the communication unit 9 as a control instruction so that the air conditioner is set at the recommended temperature via the vehicle control unit, it can automatically control to the setting temperature that will enable the vehicle to reach the energy supplying facility without troubling the user. Incidentally, as for power consuming equipment other than the air conditioner, it is also possible to automatically control to the recommended setting so as to achieve the same advantage.

Incidentally, the configuration of the foregoing embodiment 6 is applicable to the embodiments 1-4.

Incidentally, the present invention is applicable to a mobile unit driven by various energy such as an electric vehicle, hybrid car and gasoline-engined car. As various energy, there are electricity, gasoline, natural gas and alcohol, for example. Accordingly, the energy supplying facility can be constructed as an infrastructure for supplying various energy. Incidentally, the type of the mobile unit and the type of the energy are not limited to those mentioned above, and can be constructed with appropriate variations.

In addition, although the present invention is described by way of example that displays a map two-dimensionally, the map can be displayed three-dimensionally. In addition, the display method can be altered in conformity with a display content such as displaying the map two-dimensionally and the range three-dimensionally.

Figure 26:
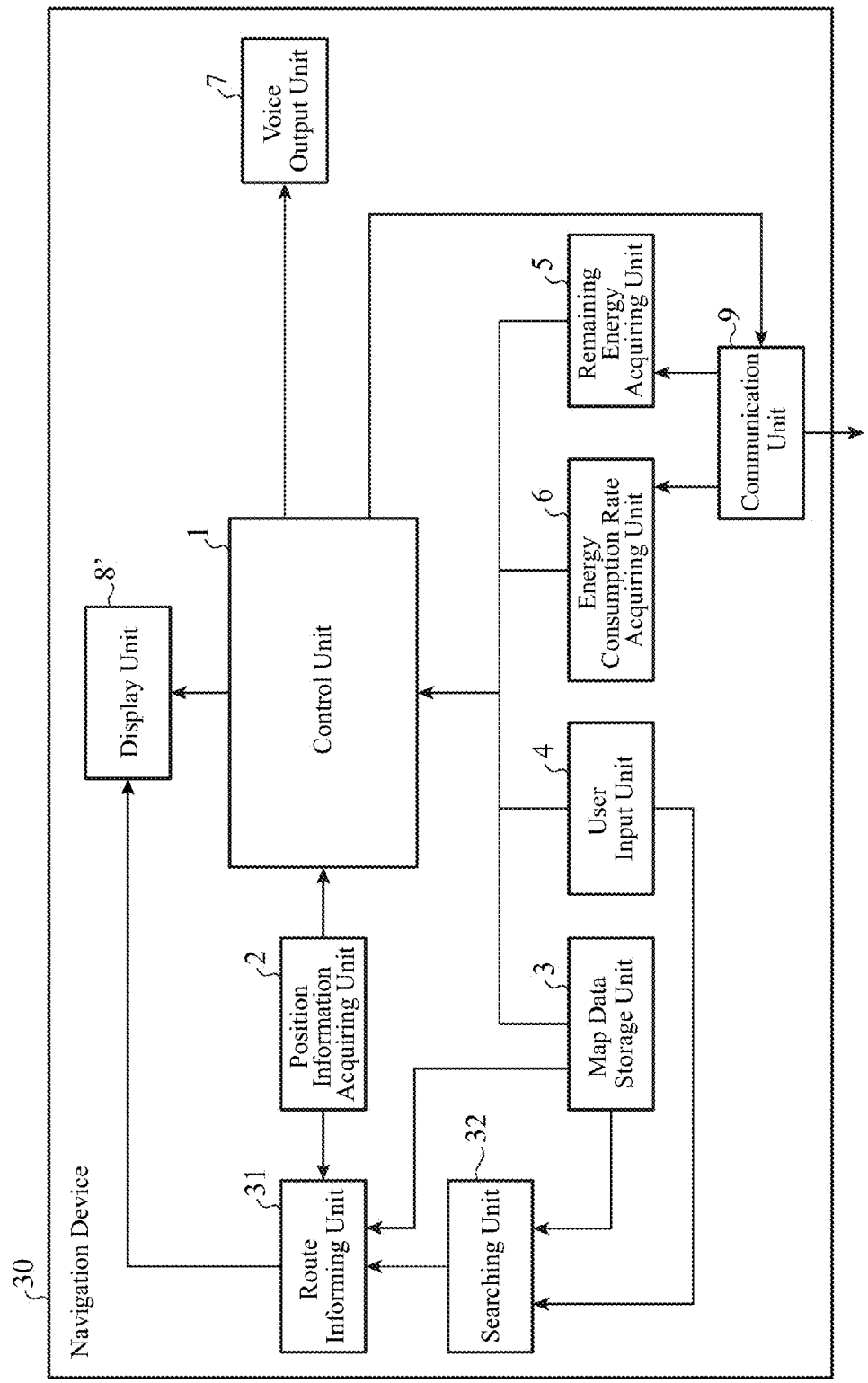
FIG. 26 is a block diagram showing a configuration of a navigation device with a function of the embodiment 1 to the embodiment 6.

Incidentally, the configurations shown from the foregoing embodiment 1 to the embodiment 6 can be applied to a navigation device. As shown in FIG. 26, a navigation device 30 can be configured by adding to the configuration of the map display device shown from the embodiment 1 to the embodiment 6, a route informing unit 31 with a route informing function, a route guidance function and a location function, and a search unit 32 with a POI (Point of Interest) searching function, and by adding to the display unit 8' a map display function.

In addition, although the foregoing embodiment 1 to embodiment 6 shows a configuration that displays an accurate map, this is not essential. For example, a configuration is also possible which displays a schematic map.

Furthermore, a configuration is also possible in which the so-called display audio equipment is provided with a map database display function and a GPS function to implement the configuration shown from the embodiment 1 to the embodiment 6

In addition, a configuration is also possible which implements the configuration shown from the foregoing embodiment 1 to the embodiment 6 on an onboard monitoring apparatus with the map database and GPS function.

Incidentally, it is to be understood that a free combination of the individual embodiments, variations of any components of the individual embodiments or removal of any components of the individual embodiments are possible within the scope of the present invention.

INDUSTRIAL APPLICABILITY

A map display device in accordance with the present invention can be mounted on a mobile unit and is applicable to a navigation device that displays a range of the mobile unit together with a map display.

DESCRIPTION OF REFERENCE SYMBOLS

1 control unit, 2 position information acquiring unit, 3 map data storage unit, 4 user input unit, 5 remaining energy acquiring unit, 6 energy consumption rate acquiring unit, 7 voice output unit, 8 display unit, 9 communication unit, 10 map display device, 11 vehicle position calculating unit, 12 input analyzer unit, 13 range calculating unit, 14 output control unit, 15 map panel unit, 16 circular route storage unit, 21 driving efficiency storage unit, 22 reachable distance calculating unit, 23 reachable area calculating unit, 24 reachable point calculating unit, 30 navigation device, 31 route informing unit, 32 searching unit, 4a dial, 4b button.

What is claimed is:

1. A map display device comprising:
a remaining energy acquiring unit for acquiring a residual quantity of energy for driving a mobile unit and equipment mounted on the mobile unit, operation of at least some of said equipment being controlled by a user through manipulation of an input unit of the equipment;
an input analyzer unit for analyzing the user's manipulation of the input unit to determine changes in the operation of said at least some of said equipment;
a range calculating unit for computing a reachable range of the mobile unit with the residual energy the remaining energy acquiring unit acquires, using a moving energy consumption rate which is energy consumption per unit time required for moving the mobile unit and a driving energy consumption rate which is energy consumption per unit time required for driving the equipment mounted on the mobile unit; and
an output control unit for displaying the reachable range the range calculating unit computes,
wherein the output control unit varies, when notified by said input analyzer unit of determined changes in the operation of said at least some of said equipment, the reachable range of the mobile unit computed by the range calculating unit in conformity with the determined changes in operation.

2. A map display device according to claim 1, further comprising:
a position information acquiring unit for acquiring the present position of a mobile unit;
a map data storage unit for storing map data; and
an output control unit for displaying on a map the reachable range of the mobile unit the range calculating unit computes, using the map data of the map data storage unit.

3. The map display device according to claim 2, wherein the range calculating unit comprises:
a reachable distance calculating unit for computing a reachable distance of the mobile unit with the remaining energy the remaining energy acquiring unit acquires, using the moving energy consumption rate and the driving energy consumption rate;
a reachable point calculating unit for computing, using the map data of the map data storage unit, a point at a distance the reachable distance calculating unit computes from the present position of the mobile unit the position information acquiring unit acquires; and
a reachable area calculating unit for computing the reachable range of the mobile unit from the point the reachable point calculating unit computes.

4. The map display device according to claim 3, further comprising:
a circular route storage unit for storing a circular route of the mobile unit and distance information on the circular route, wherein
the range calculating unit computes an estimated driving energy consumption rate which is energy consumption per unit time required for driving the equipment estimated to be used from a surrounding condition at the present position of the mobile unit which is acquired from the position information acquiring unit;
the reachable distance calculating unit computes the reachable distance with the residual quantity of energy the remaining energy acquiring unit obtains, using the moving energy consumption rate and the estimated driving energy consumption rate; and
the output control unit gives a warning display indicating that traveling of the circular route is impossible when the distance of the circular route stored in the circular route storage unit is longer than the distance the reachable distance calculating unit computes.

5. The map display device according to claim 2, further comprising:
a driving efficiency storage unit for storing a driving efficiency corresponding to a driving environment of the mobile unit, wherein
the range calculating unit computes the reachable range using the driving efficiency corresponding to the driving environment of the mobile unit.

6. The map display device according to claim 2, wherein the map data contains information about a parking permitted spot for the mobile unit; and
the range calculating unit, when the reachable range of the mobile unit is a parking unpermitted spot for the mobile unit, designates a parking permitted spot for the mobile unit within the reachable range of the mobile unit as a new reachable range by referring to the map data.

7. The map display device according to claim 2, wherein the range calculating unit computes an estimated driving energy consumption rate which is energy consumption per unit time required for driving the equipment estimated to be used from a surrounding condition at the present position of the mobile unit which is acquired from the position information acquiring unit, and computes the reachable range with the residual quantity of energy the remaining energy acquiring unit obtains, using the moving energy consumption rate, the driving energy consumption rate, and the estimated driving energy consumption rate.

8. The map display device according to claim 7, wherein the surrounding condition is at least one of a driving region, date and time of the mobile unit and weather.

9. The map display device according to claim 2, wherein
the map data contains information about a place where a facility for supplying energy to the mobile unit is located;
the range calculating unit computes again, when an operation of increasing the driving energy consumption rate is performed, the reachable range with the remaining energy the remaining energy acquiring unit acquires, using the moving energy consumption rate and the driving energy consumption rate increased by the operation; and
the output control unit gives a warning display by referring to the map data of the map data storage unit when a facility for supplying energy to the mobile unit does not exist within the reachable range computed again.

10. The map display device according to claim 9, wherein the output control unit, referring to the map data, displays as a recommended condition a setting of the equipment which corresponds to the reachable range that includes the facility for supplying energy to the mobile unit among reachable ranges of the mobile unit computed by the range calculating unit.

11. The map display device according to claim 10, wherein the output control unit supplies the equipment with the recommended condition.

12. A map display method comprising:
acquiring the present position of a mobile unit;
acquiring a residual quantity of energy for driving the mobile unit and equipment mounted on the mobile unit, operation of at least some of said equipment being controlled by a user through manipulation of an input unit of the equipment;
analyzing the user's manipulation of the input unit to determine changes in the operation of said at least some of said equipment;
computing a reachable range of the mobile unit with the acquired residual energy, using a moving energy consumption rate which is energy consumption per unit time required for moving the mobile unit and a driving energy consumption rate which is energy consumption per unit time required for driving the equipment mounted on the mobile unit; and
displaying, via an output control unit, the reachable range of the mobile unit on a map using the map data; and
wherein the output control unit varies, when changes in the operation of said at least some of said equipment are determined by the analysis of the user's manipulation of the input unit, the computed reachable range of the mobile unit in conformity with the determined changes in operation.

13. A map display device comprising:
a processor configured to execute a program; and
a memory that stores the program which, when executed by the processor, results in performance of steps comprising:
acquiring a residual quantity of energy for driving a mobile unit and equipment mounted on the mobile unit, operation of at least one of said equipment being controlled by a user through manipulation of an input unit of the equipment,
analyzing the user's manipulation of the input unit to determine changes in the operation of said at least one of said equipment,
computing a reachable range of the mobile unit with the residual energy the remaining energy acquired, using a moving energy consumption rate which is energy consumption per unit time required for moving the mobile unit and a driving energy consumption rate which is energy consumption per unit time required for driving the equipment mounted on the mobile unit, and
outputting the reachable range computed,
wherein the processor varies the outputted reachable range in conformity with the determined changes in the operation of said at least one of said equipment.

* * * * *